(12) United States Patent
Engelke et al.

(10) Patent No.: US 11,588,936 B2
(45) Date of Patent: *Feb. 21, 2023

(54) COMMUNICATION DEVICE AND METHODS FOR USE BY HEARING IMPAIRED

(71) Applicant: ULTRATEC, INC., Madison, WI (US)

(72) Inventors: Robert M. Engelke, Madison, WI (US); Kevin R. Colwell, Middleton, WI (US); Troy Vitek, Waunakee, WI (US)

(73) Assignee: ULTRATEC, INC., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,512

(22) Filed: Jun. 14, 2021

(65) Prior Publication Data

US 2021/0306455 A1    Sep. 30, 2021

Related U.S. Application Data

(60) Continuation of application No. 16/531,991, filed on Aug. 5, 2019, now Pat. No. 11,070,669, which is a
(Continued)

(51) Int. Cl.
*H04M 11/00*    (2006.01)
*H04M 3/42*    (2006.01)
(Continued)

(52) U.S. Cl.
CPC ........ *H04M 3/42391* (2013.01); *G06F 3/165* (2013.01); *H04L 67/02* (2013.01);
(Continued)

(58) Field of Classification Search
CPC ................. H04L 67/01; H04L 67/1095; H04L 1/274508; H04L 1/274516; H04L 3/42178;
(Continued)

(56) References Cited

U.S. PATENT DOCUMENTS 5,392,343 A    2/1995 Davitt et al.
5,463,665 A    10/1995 Millios et al.
(Continued)

FOREIGN PATENT DOCUMENTS

WO    9750222 A1    12/1997

OTHER PUBLICATIONS

Petition for Inter Partes Review for U.S. Pat. No. 10,469,660, *CaptionCall, LLC* v. *Ultratec, Inc.*, United States Patent and Trademark Office Before the Patent Trial and Appeal Board, Jul. 1, 2020, 68 pages.

(Continued)

*Primary Examiner* — Binh Kien Tieu
(74) *Attorney, Agent, or Firm* — Quarles & Brady LLP

(57) ABSTRACT

A method for maintaining contact information in a hearing impaired assisted user's communication device includes the steps of (a) providing a web site for altering assisted user contact information, (b) linking a proxy device to the web site, (c) receiving an identifier associated with the assisted user's device via the proxy device, (d) identifying an assisted user's device via the received identifier, (e) enabling the proxy device to be used to modify contact information for the assisted user associated with the received identifier, (f) starting a timer to time out a sync timeout period, (g) during the sync timeout period, receiving an indication via the assisted user's device confirming a desire to update the assisted user's contact information, (h) updating the assisted user's contact information, and (i) at the end of the timeout period, ceasing an indication that updated data is ready to be used from the assisted user's device.

20 Claims, 16 Drawing Sheets

Related U.S. Application Data continuation of application No. 16/379,381, filed on Apr. 9, 2019, now Pat. No. 11,064,070, which is a continuation of application No. 16/030,580, filed on Jul. 9, 2018, now Pat. No. 10,298,753, which is a division of application No. 14/573,085, filed on Dec. 17, 2014, now Pat. No. 10,051,120.

(60) Provisional application No. 61/918,817, filed on Dec. 20, 2013.

(51) Int. Cl.
| | |
|---|---|
| H04M 1/247 | (2021.01) |
| H04L 67/02 | (2022.01) |
| H04R 25/00 | (2006.01) |
| H04M 1/2757 | (2020.01) |
| G06F 3/16 | (2006.01) |

(52) U.S. Cl.
CPC ....... *H04M 1/2475* (2013.01); *H04M 1/2757* (2020.01); *H04M 3/42161* (2013.01); *H04R 25/505* (2013.01); *H04M 2201/14* (2013.01); *H04M 2201/22* (2013.01); *H04R 25/558* (2013.01)

(58) Field of Classification Search
CPC ......... H04L 12/2809; H04L 2012/2841; H04L 67/1097; H04L 51/08; H04L 51/10; H04L 67/26; H04L 1/56
USPC .. 379/52, 93.01, 93.05, 93.07, 93.17, 93.23, 379/142.01, 142.17
See application file for complete search history.

(56) References Cited

U.S. PATENT DOCUMENTS

| | | | |
|---|---|---|---|
| 5,671,267 | A | 9/1997 | August et al. |
| 5,737,389 | A * | 4/1998 | Allen ............... H04M 3/40 379/1.01 |
| 6,072,860 | A | 6/2000 | Kek et al. |
| 6,075,842 | A | 6/2000 | Engelke et al. |
| 6,212,496 | B1 | 4/2001 | Campbell et al. |
| 6,418,196 | B1 | 7/2002 | Brlenic et al. |
| 6,430,270 | B1 | 8/2002 | Cannon et al. |
| 6,603,835 | B2 | 8/2003 | Engelke et al. |
| 6,704,421 | B1 | 3/2004 | Kitamura |
| 6,944,474 | B2 | 9/2005 | Rader et al. |
| 7,027,569 | B2 | 4/2006 | Price |
| 7,177,417 | B2 | 2/2007 | Michaelis |
| 7,181,297 | B1 | 2/2007 | Pluvinage et al. |
| 7,190,975 | B2 | 3/2007 | Rho |
| 7,415,120 | B1 | 8/2008 | Vaudrey et al. |
| 7,933,587 | B1 | 4/2011 | Swan |
| 8,284,960 | B2 | 10/2012 | Vaudrey et al. |
| 8,738,072 | B1 | 5/2014 | Messerian |
| 8,917,892 | B2 | 12/2014 | Poe et al. |
| 9,628,621 | B2 | 4/2017 | van Rensburg et al. |
| 9,774,674 | B1 | 9/2017 | Gailloux et al. |
| 10,051,120 | B2 | 8/2018 | Engelke et al. |
| 10,185,539 | B2 | 1/2019 | Bailey et al. |
| 10,298,753 | B1 | 5/2019 | Engelke et al. |
| 10,469,660 | B2 | 11/2019 | Engelke et al. |
| 10,491,746 | B2 | 11/2019 | Engelke et al. |
| 10,587,751 | B2 | 3/2020 | Engelke et al. |
| 11,070,669 | B2 * | 7/2021 | Engelke ............ H04M 3/42161 |
| 2001/0005825 | A1 | 6/2001 | Engelke et al. |
| 2001/0033819 | A1 * | 10/2001 | Zhdanok ............ C01B 3/382 423/418.2 |
| 2002/0085685 | A1 | 7/2002 | Engelke et al. |
| 2002/0193076 | A1 | 12/2002 | Rogers et al. |
| 2003/0045329 | A1 | 3/2003 | Kinoshita |
| 2003/0063731 | A1 | 4/2003 | Woodring |
| 2003/0097262 | A1 | 5/2003 | Nelson |
| 2003/0182000 | A1 | 9/2003 | Muesch et al. |
| 2004/0033819 | A1 * | 2/2004 | Hymel ............... H04M 1/6016 455/551 |
| 2005/0063520 | A1 | 3/2005 | Michaelis |
| 2005/0129185 | A1 | 6/2005 | McClelland et al. |
| 2005/0232169 | A1 | 10/2005 | McLaughlin et al. |
| 2005/0259641 | A1 | 11/2005 | Beninato et al. |
| 2005/0260985 | A1 | 11/2005 | Rader et al. |
| 2007/0047702 | A1 | 3/2007 | Newell et al. |
| 2009/0187956 | A1 | 7/2009 | Sommer |
| 2009/0245539 | A1 | 10/2009 | Vaudrey et al. |
| 2010/0016003 | A1 | 1/2010 | Shapiro et al. |
| 2010/0220358 | A1 | 9/2010 | Beninato et al. |
| 2011/0093272 | A1 | 4/2011 | Isobe et al. |
| 2011/0125494 | A1 * | 5/2011 | Alves ............... G10L 25/78 704/226 |
| 2012/0076009 | A1 | 3/2012 | Pasko |
| 2012/0140937 | A1 | 6/2012 | Poe et al. |
| 2012/0282976 | A1 | 11/2012 | Suhami |
| 2013/0282377 | A1 | 10/2013 | Huh et al. |
| 2014/0153705 | A1 | 6/2014 | Moore et al. |
| 2014/0194775 | A1 | 7/2014 | Van Hasselt et al. |
| 2014/0314261 | A1 | 10/2014 | Selig et al. |
| 2014/0333957 | A1 | 11/2014 | Beninato et al. |
| 2015/0081860 | A1 | 3/2015 | Kuehnel et al. |
| 2015/0120607 | A1 | 4/2015 | Ramsunder et al. |
| 2015/0134604 | A1 | 5/2015 | Efrati et al. |
| 2015/0281853 | A1 | 10/2015 | Eisner et al. |
| 2015/0320344 | A9 | 11/2015 | Van Hasselt et al. |
| 2016/0192093 | A1 * | 6/2016 | Blarney ............ H04R 25/305 381/314 |
| 2017/0027522 | A1 | 2/2017 | Van Hasselt et al. |
| 2017/0070611 | A1 | 3/2017 | Silver |
| 2017/0237854 | A1 | 8/2017 | Koum et al. |
| 2018/0020346 | A1 | 1/2018 | Li |
| 2018/0198920 | A1 | 7/2018 | Kahn |
| 2018/0321908 | A1 | 11/2018 | Bailey et al. |
| 2019/0158201 | A1 * | 5/2019 | Saito ............... H04R 3/005 |
| 2020/0374637 | A1 | 11/2020 | Li et al. |
| 2020/0411025 | A1 | 12/2020 | Karimi-Cherkandi et al. |

OTHER PUBLICATIONS

Declaration of Benedict J. Occhiogrosso for U.S. Pat. No. 10,469,660, *CaptionCall, LLC* v. *Ultratec, Inc.*, United States Patent and Trademark Office Before the Patent Trial and Appeal Board, Jun. 23, 2020, 113 pages.

U.S. Appl. No. 60/562,795 to McLaughlin et al., filed Apr. 16, 2004, 126 pages.

Blackberry, RIM Introduces New Color BlackBerry Handheld for CDMA2000 1X Wireless Networks, BlackBerry Press Release, Mar. 22, 2004, 2 pages.

Blackberry Wireless Handheld User Guide, 7750, Mar. 16, 2004, 144 pages.

Federal Communications Commission, Telecommunication Relay Services and Speech-to-Speech Services for Individuals With Hearing and Speech Disabilities, 68 Fed. Reg. 50973-50978 (Aug. 25, 2003).

PhoneDB, RIM BlackBerry 7750 Device Specs, Copyright 2006-2020 PhoneDB, 6 pages.

PHONESDATA, Nokia 6620 Specs, Review, Opinions, Comparisons, Copyright 2020, 9 pages.

Sundgot, Nokia Unveils the 6600, InfoSync World, Jun. 16, 2003, 2 pages.

Wikipedia, Dell Axim, https://en.wikipedia.org/wiki/Dell_Axim, Last Edited on Feb. 23, 2020, 4 pages.

Wikipedia, Palm Tungsten, https://en.wikipedia.org/wiki/Palm_Tungsten, Last Edited on Oct. 6, 2019, 10 pages.

Final Written Decision, U.S. Pat. No. 9,131,045, Case IPR2015-01889, *CaptionCall, LLC* v. *Ultratec, Inc.*, United States Patent and Trademark Office Before the Patent Trial and Appeal Board, Apr. 11, 2017, 118 pages.

Judgment, U.S. Pat. No. 7,881,441, Case IPR2015-01886, *CaptionCall, LLC* v. *Ultratec, Inc.*, United States Patent and Trademark Office Before the Patent Trial and Appeal Board, Jun. 9, 2016, 4 pages.

(56) References Cited

OTHER PUBLICATIONS

Petition for Inter Partes Review for U.S. Pat. No. 10,491,746, *CaptionCall, LLC* v. *Ultratec, Inc.*, United States Patent and Trademark Office Before the Patent Trial and Appeal Board, Jul. 1, 2020, 61 pages.
Declaration of Benedict J. Occhiogrosso for U.S. Pat. No. 10,491,746, *CaptionCall, LLC* v. *Ultratec, Inc.*, United States Patent and Trademark Office Before the Patent Trial and Appeal Board, Jun. 23, 2020, 79 pages.
Arlinger, Negative Consequences of Uncorrected Hearing Loss—A Review, International Journal of Audiology, 2003, 42:2S17-2S20.
Petition for Inter Partes Review for U.S. Pat. No. 10,587,751, *CaptionCall, LLC* v. *Ultratec, Inc.*, United States Patent and Trademark Office Before the Patent Trial and Appeal Board, Jul. 1, 2020, 64 pages.
Declaration of Benedict J. Occhiogrosso for U.S. Pat. No. 10,587,751, *CaptionCall, LLC* v. *Ultratec, Inc.*, United States Patent and Trademark Office Before the Patent Trial and Appeal Board, Jun. 23, 2020, 106 pages.
Curtis et al., Doctor-Patient Communication on the Telephone, Can Fam Physician, 1989, 35:123-128.
United States Patent and Trademark Office Before the Patent Trial and Appeal Board, Decision Denying Institution of Inter Partes Review, *CaptionCall LLC* v. *Ultratec Inc.*, Case IPR2020-01215, U.S. Pat. No. 10,469,660, Jan. 27, 2021, 24 pages.
United States Patent and Trademark Office Before the Patent Trial and Appeal Board, Petitioner's Request for Rehearing Pursuant to 37 C.F.R. 42.71 (d), *CaptionCall LLC* v. *Ultratec Inc.*, Case IPR2020-01215, U.S. Pat. No. 10,469,660, Feb. 18, 2021, 19 pages.

* cited by examiner

COMMUNICATION DEVICE AND METHODS FOR USE BY HEARING IMPAIRED

CROSS-REFERENCE TO RELATED APPLICATIONS

This application is a continuation of U.S. patent application Ser. No. 16/531,991, filed on Aug. 5, 2019, which is a continuation of U.S. patent application Ser. No. 16/379,381, filed on Apr. 9, 2019, which is a continuation of U.S. patent application Ser. No. 16/030,580, filed on Jul. 9, 2018, now U.S. Pat. No. 10,298,753, which is a division of U.S. patent application Ser. No. 14/573,085, filed on Dec. 17, 2014, now U.S. Pat. No. 10,051,120, which claims priority to U.S. Provisional Patent Application Ser. No. 61/918,817, filed on Dec. 20, 2013, all of which are entitled "COMMUNICATION DEVICE AND METHODS FOR USE BY HEARING IMPAIRED," and all of which are incorporated herein by reference in their entirety.

STATEMENT REGARDING FEDERALLY SPONSORED RESEARCH OR DEVELOPMENT

Not applicable.

BACKGROUND OF THE INVENTION

The present invention relates to communication devices and methods for hearing impaired persons and more specifically to concepts related to helping a hearing impaired person maintain a contact list and to personally customize the tone of voice messages broadcast by a communication device used by the hearing impaired person.

Special phones which are referred to hereinafter as assisted user devices have been developed that provide captioning services to deaf or partially hearing impaired persons (hereinafter "assisted users"). To this end, when a hearing user and an assisted user are participating in a voice telephone call, when the hearing user speaks, the hearing user's voice is transmitted to a remote relay where the hearing user's voice is translated into text, often with the aid of a call assistant or relay operator. The text is transmitted to the assisted user's device where the text is displayed via a device display for the assisted user to view, generally at the same time that the hearing user's voice is broadcast via a device speaker to the assisted user to hear. Transmission of voice and text can be along various types of communication links including conventional telephone lines, the internet or some other type of communication network, wirelessly, etc. Exemplary assisted user devices and relay systems are well known in the art. For example, see U.S. Pat. No. 6,603,835 entitled "System for Text Assisted Telephony" which issued on Aug. 5, 2003 and which is incorporated herein in its entirety by reference. While relay assisted user devices have proven extremely useful to hearing impaired persons, such devices still have several shortcomings.

One shortcoming associated with assisted user devices is related to maintaining up-to-date contact information on the device. At least some assisted user devices have the ability to store contact information for expediting access to phone numbers and other information and for expediting the process of placing calls to others. Here, in many cases, a phone number dialing keyboard serves double duty as a tool to enter contact information including contact names, phone and other numbers, e-mail addresses and perhaps other information. In some cases a full QWERTY keyboard may be provided for entering contact information. To initiate a call to a contact from a previously entered contact list, some type of input device is provided for scrolling through or otherwise searching for a specific contact and to place a call to a selected contact via the assisted user's device.

While device stored contact information has proven very useful in assisted user devices when used, the processes for entering contact information have often proven to be an impediment to use. To this end, double duty data input components (e.g., a dialing pad) on some assisted user devices often are not intuitive to use. Even where an assisted user's device includes a full QWERTY keyboard for information entry, steps required for entering contact information are often complex and/or confusing. Where a tool is not intuitive, users routinely forego use of the tool and the advantages associated therewith.

Many people now use computers to maintain extensive contact information for business and personal associates. For instance, Microsoft Outlook is one popular software program that is used by many computer users to maintain contact information. One advantage associated with maintaining contact information via a computer is that computers include a full QUERTY keyboard and a large display for entering contact information.

In addition to maintaining contact information via a computer, many smart phone and other communication devices today provide the ability for a device user to store and access contact information including names, phone numbers, e-mail addresses, regular addresses, pictures, etc., for virtually thousands of people. In many cases a smart phone user is also a computer user. Most phone and computer users want access to the same contact information via their computer and their smart phone. For this reason, systems have been developed whereby a phone and a computer can be linked to the same contact storing account so that contact information can be automatically synchronized between a smart phone and a computer.

While automated synchronization between smart phone and computer contact information is useful if an assisted user has and regularly uses a computer, many assisted users do not regularly use a computer and, if they do use a computer, may not use software on the computer to store contact information. In this regard, many hearing impaired persons are elderly, having lost a portion of their hearing capability over time. Elderly people often do not keep up with technological advances and therefore many are uncomfortable with using software including contact storing software. Thus, even if contact information on an assisted user's device and a computer were to be synchronized, in many cases an assisted user would not take advantage of the synchronizing function or maintaining a complete contact list and instead would forego advantages associated with an up-to-date list.

Another shortcoming associated with assisted user devices is related to customizing audio tone parameters for specific assisted users. It has been recognized that people that experience hearing loss do not all experience hearing loss in the same way. Thus, for instance, one assisted user may experience loss of hearing at high frequencies while another experiences loss at lower frequencies and a third may experience impaired hearing at multiple frequencies. Because assisted users experience hearing loss differently, not surprisingly communication devices used by assisted users have been developed that enable a user to adjust frequency responses or tone differently to accommodate individual user preferences. In other words, the devices enable a user to increase or decrease bass, increase or decrease treble, etc.

To adjust tone, manual equalizer type controls, either mechanical or virtual on a display, have been provided on assisted user devices. In known cases an equalizer feature may include five or more independently selectable slider buttons or virtual icons (hereinafter "slider controls"), each corresponding to a different frequency within the human hearing range. Each slider control is typically arranged along a vertical slide column where vertical positions along the slide column correspond to different decibel values along a range. By setting the slider controls at different locations along the ranges, the tone of sounds generated by an assisted user's device is customized.

Where devices have controls such as equalizers for customizing tone, typically parameters are set during a phone call. For instance, while an assisted user is carrying on a conversation with a hearing user via the assisted user's device, the assisted user accesses the equalizer controls and adjusts those controls until the user perceives that a tone is optimized (e.g., that the user hears best with a set of slider control settings). After the equalizer settings are set, the settings remain set during subsequent calls unless the assisted user resets the settings during a subsequent call. While this solution can be used, the requirement to set equalizer settings during a call in order to hear the effects of the settings is burdensome as it requires the assisted user to adjust around with settings during a conversation. In many cases an assisted user may completely miss a portion of a conversation while simultaneously setting slider controls or may misperceive what was said by a hearing user.

In addition, oftentimes voice messages from a hearing user during a call may not be optimized for setting tone. To this end, a specific hearing user may have an unusual voice or may speak in a low or high volume which is out of the ordinary. Here, if an assisted user sets tone or other audio parameters using an unusual voice or under odd circumstances, the settings will likely be less than optimal during conversations with other hearing users or when the odd circumstances are not present (e.g., when a hearing user speaks in a normal volume range).

BRIEF SUMMARY OF THE INVENTION

It has been recognized that many hearing impaired persons have care givers (hereafter "a proxy"; e.g., a son or daughter, a friend, a relative, etc.) that can help maintain an assisted user device contact list from a remote location and in a limited way that does not cause a sense of invasion of an assisted user's privacy. To this end, in at least some embodiments of the present invention, a web site is provided that can be used by an assisted user's proxy to update/maintain contact information on an assisted user's device. Here, each assisted user device is assigned a unique assisted user device identification number. An assisted user can give her device identification number to a local or remote proxy. For instance, an assisted user may give her device identification number to her daughter living at a location remote from the assisted user's residence (e.g., in another state). The proxy can access the website via a conventional internet browser running on any computer (e.g., the proxy's personal computer) and enter the device identification number into a field to indicate the device for which contact information is to be modified. Once the identification number has been entered, the proxy can change existing or enter new contact information in an intuitive fashion.

After entering new or changing existing contact information, the proxy can select a "sync" control (e.g., a virtual button on a display screen) to store the changed information and place the server in a waiting state to wait for an indication generated using the assisted user's device to sync information. Subsequently, once the assisted user accesses the assisted user's device, the assisted user selects a sync control (e.g., virtual button on a display screen) causing the assisted user's device to link to the system server and indicate that the assisted user desires to synchronize the server and user device contact information. If changes to the contact information exist synchronization begins. If the most recent changes to the contact information have already been synchronized with the assisted user's device, a synchronization timer simply times out.

For security purposes, in at least some embodiments, synchronization may only be enabled either while the proxy is still linked to the website or within a short time (e.g., one hour) after the proxy has selected the sync control or exited the website. In addition to changing contact list information, a proxy may also be able to change speed dial preferences, a favorites list for an assisted user or other types of information.

In at least some cases if a proxy has made changes to an assisted user's contact list or other device information and requested a sync without the assisted user also confirming a desire to sync by selecting a sync control on the assisted user's device, the changes may be stored by the server running the website to be used subsequently to attempt to sync. For instance, two days after a proxy makes changes and unsuccessfully attempts to sync, the proxy may confirm that an assisted user is available to retry a synchronizing process and the sync control selection process described above may be repeated.

In still other embodiments the system may be programmed to require both an assisted user and a proxy for the user to enter the same pin or password in order to update contact or other information on the assisted user's device. For instance, when a proxy selects a sync control (e.g., a virtual button or icon on a display), the system server may be programmed to generate a four digit pin number and present that number to the proxy. Here, when the proxy contacts the assisted user to indicate that a synchronization process should be initiated, the proxy would give the four digit pin number to the assisted user. Then, when the assisted user selects a sync control to initiate a synchronization process, the assisted user's device would query the assisted user for the four digit pin number. Upon entry of the pin number the sync process would then commence. In other cases upon selecting a sync control, the server may require the proxy to enter any four digit pin number (e.g., a number selected by the proxy) and instruct the proxy to provide the entered number to the assisted user. Here, upon the assisted user entering the pin via the user's device, synchronization would commence.

Regarding assisted user devices that include an equalizer, it has been recognized that an equalizer or other tone controllers can be set on an assisted user's device independent of a call between the assisted user and another person. To this end, a device processor can store sample voice recordings that can be played by an assisted user as the user modifies tone settings. During a setup procedure the assisted user can listen to the sample recordings with different tone settings and can select optimized settings for the particular user given the user's specific hearing impairment. Once tone settings have been optimized, the settings can be stored for subsequent use. In at least some embodiments the recordings include both male and female voices so that an assisted user can identify optimized tone settings for all types of voices. Other parameters in addition to tone may be set during similar processes including volume, etc. In addition, tone can be set by separately adjusting treble, bass or other parameters during commissioning and while listening to sample recordings.

In at least some embodiments two or more optimized tone settings may be selected for different types of voices and the user's device may then select an optimized tone setting based on characteristics of a voice received by the assisted user's device. For instance, a user may set an optimized tone setting for a typical relatively low male voice and a second optimized tone setting for a typical relatively high female voice. Then, when a call is received, an assisted user's device may modify tone setting as a function of characteristics of the voice message received by the device.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
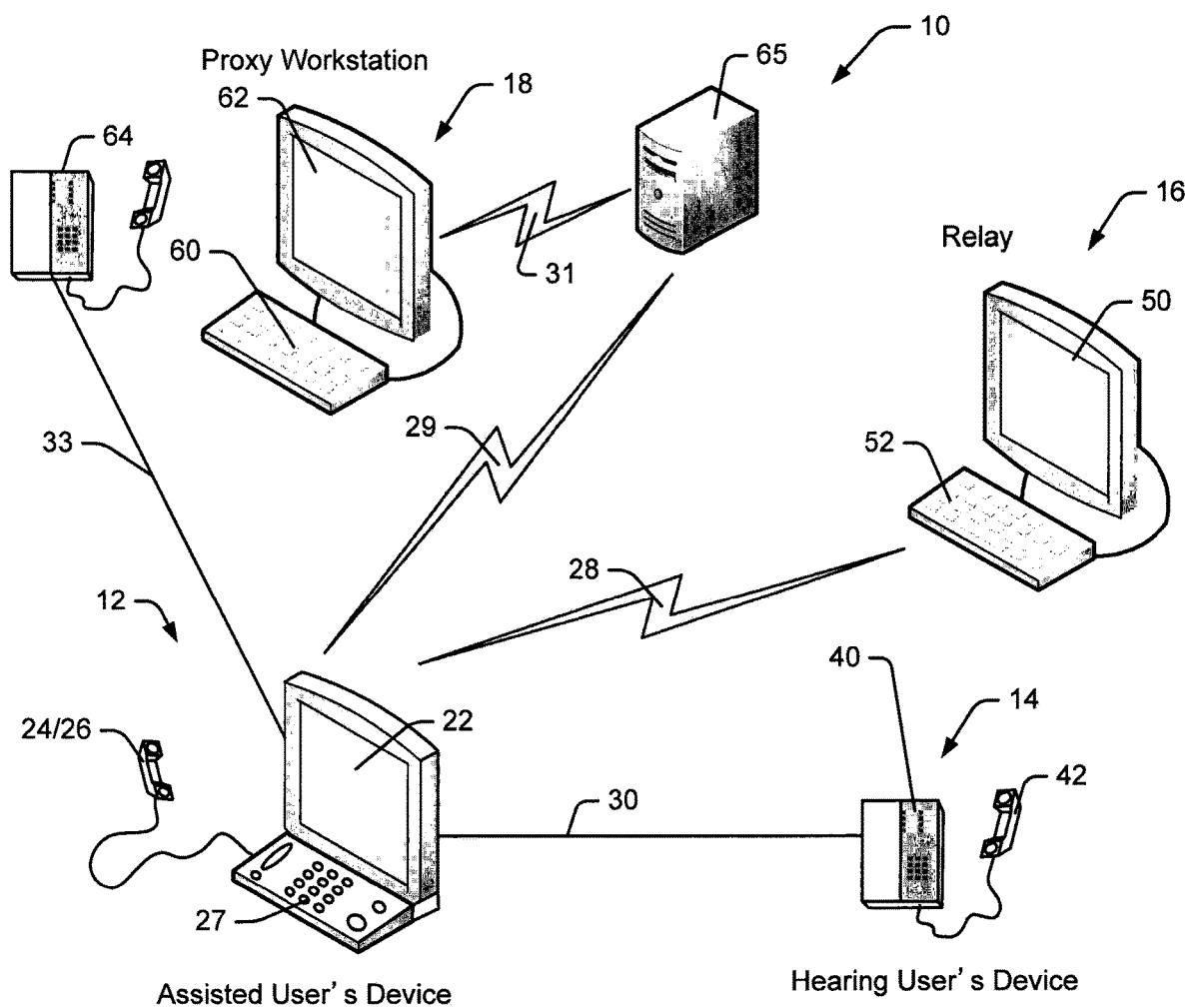
FIG. 1 is a schematic diagram illustrating an exemplary communication system including an assisted user's text captioning device that is consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

Referring now to the drawings wherein like reference numerals correspond to similar elements throughout the several view and, more specifically, referring to FIG. 1, the present invention will be described in the context of an exemplary communication system 10 including, among other components, an assisted user's communication device 12, a hearing user's communication device 14, a computer or system 16 used by a relay operator to assist an assisted user in communicating with a hearing user, a computer or other type of proxy workstation 18 for use by a person assisting the user of device 12 and a system server 65. The assisted user's device 12 may be linked via a telephone line 30 to the hearing user's device 14 to facilitate a voice telephone call between an assisted user and a hearing user. To this end, referring also to FIG. 2, an exemplary assisted user device 12 includes a processor 20, a speaker 24, a microphone 26, a keyboard 27 and a telephone link 30. In at least some embodiments, as shown in FIG. 1, the speaker and microphone 24 and 26, respectively, may be provided in a conventional telephone handset that an assisted user can hold up to the user's ear and mouth during communication.

Referring again to FIG. 1, the exemplary hearing user's device 14 is shown as a telephone including a keyboard 40 and a handset 42 that would include, among other components, a speaker and a microphone that are not separately labeled. In other embodiments, the hearing user's device may include other types of communication devices such as, for instance, a cellular telephone, a smart phone, or any other type of telephone or communication device. The telephone link 30 shown in FIGS. 1 and 2 may be a conventional telephone line or any other type of communication link including but not limited to the internet, another network connection, a wireless connection, etc.

To place a call from the assisted user's device 12 to the hearing user's device 14, an assisted user may pick up the handset 24/26 and simply dial a telephone number associated with the hearing user's device 14 using keyboard 27. During a voice communication with a hearing user, the assisted user's voice is transmitted by device 12 via line 30 to device 14. Similarly, a hearing user's voice is transmitted along line 30 to device 12 and is broadcast via the speaker 24 in the handset of device 12 to the ear of the assisted user.

When an assisted user has difficulty hearing voice messages broadcast via speaker 24 from the hearing user, the assisted user can initiate a captioning service whereby the voice messages of the hearing user are transcribed into text and presented to the assisted user via the assisted user's device 12 substantially simultaneously with broadcast of the hearing user's voice messages. To this end, referring again to FIGS. 1 and 2, assisted user's device 12 also includes a display 22 and a relay link 28. When an assisted user initiates a captioning service, processor 20 in the assisted user's device 12 connects via link 28 to the relay 16 and provides the hearing user's voice messages to the relay 16. The link 28 may be any type of link including a conventional telephone line, an internet or other network type link, a wireless link, etc.

At the relay 16, the hearing user's voice messages are transcribed into text and the text is transmitted back to the assisted user's device 12 via link 28 or a third communication link and the transcribed text is presented to the assisted user via display 22. The voice to text conversion or transcription at relay 16 may be automated, partially automated or facilitated via a call assistant that listens to the hearing user's voice messages and either types or revoices or both types and revoices the voice messages to transcribe the text as known in the art.

Referring to FIG. 1, the exemplary proxy workstation 18 includes a computer or other type of workstation and, in at least some embodiments, may be equipped with a telephone 64. The proxy computer includes some type of input device like a keyboard 60 as well as an output device such as, for instance, a display screen 62. The proxy computer can be linked via a communication line or link of some type identified by numeral 31 to the system server 65. The link 31 may be any type of communication link including a conventional telephone line, an internet or other network-type link, a wireless link, etc. As shown in FIG. 1, phone 64 can be linked to the assisted user's device 12 so that a proxy working on workstation 18 can communicate verbally with an assisted user using device 12.

Referring yet again to FIG. 1, the assisted user's device 12 may also be linked via a line or some type of communication link 29 to server 65. Server 65, among other things, runs software that enables the server to post a website that can be accessed by the proxy using station 18. In addition, server 65 can be linked via line 29 to assisted user's device 12 to cooperate with software on the user's device 12 to provide information to the assisted user using device 12 and to, on at least some of the embodiments, update information such as contact information or other types of information stored in a memory accessible by the device processor 20 (see again FIG. 2).

Referring again to FIG. 1, any of the computers at the relay or at the proxy workstation and the assisted user's device 12 may include a touch sensitive display screen and/or a more conventional input device such as a mouse or other mechanical input device for controlling movement and activation of a cursor on an associated computer display screen for pointing to, selecting or otherwise interacting with virtual buttons or other controls on the display screen. Hereafter it will be assumed that at least the assisted user device 12 includes a touch screen 22 unless indicated otherwise.

Figure 2:
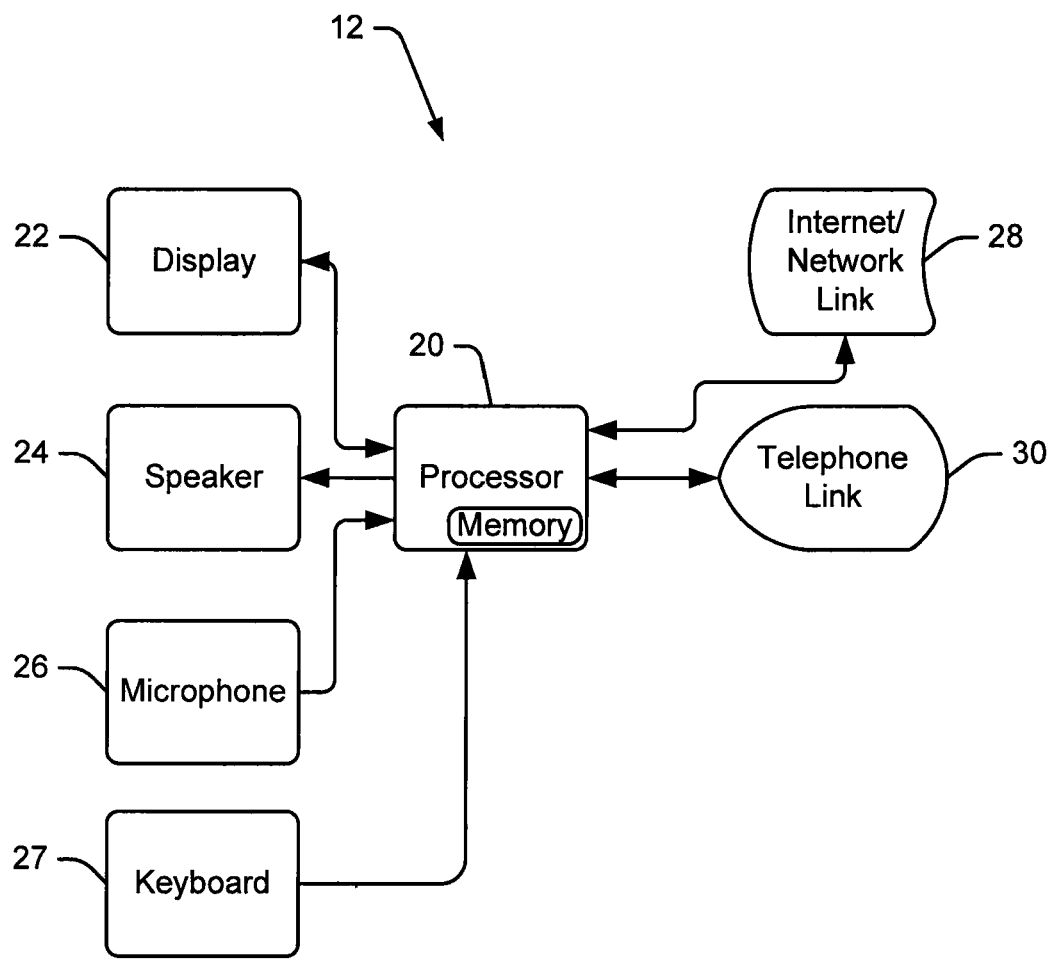
FIG. 2 is a schematic diagram illustrating components of the assisted user's device shown in FIG. 1.
Figure 8:
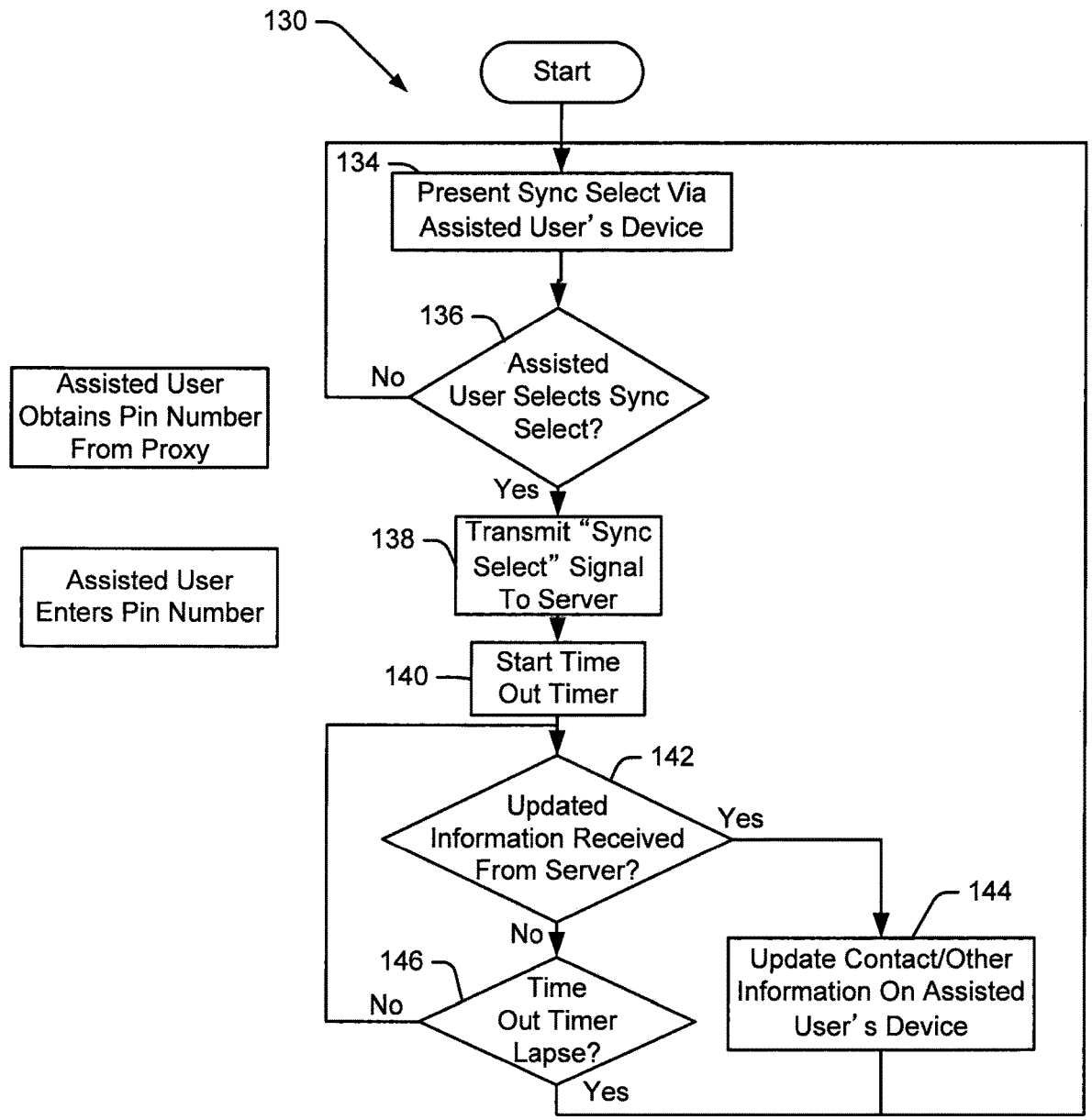
FIG. 8 is a flow chart illustrating a process that may be performed by the assisted user's device processor shown in FIG. 2 for consenting to changes to contact and other information entered by a proxy.
Figure 9:
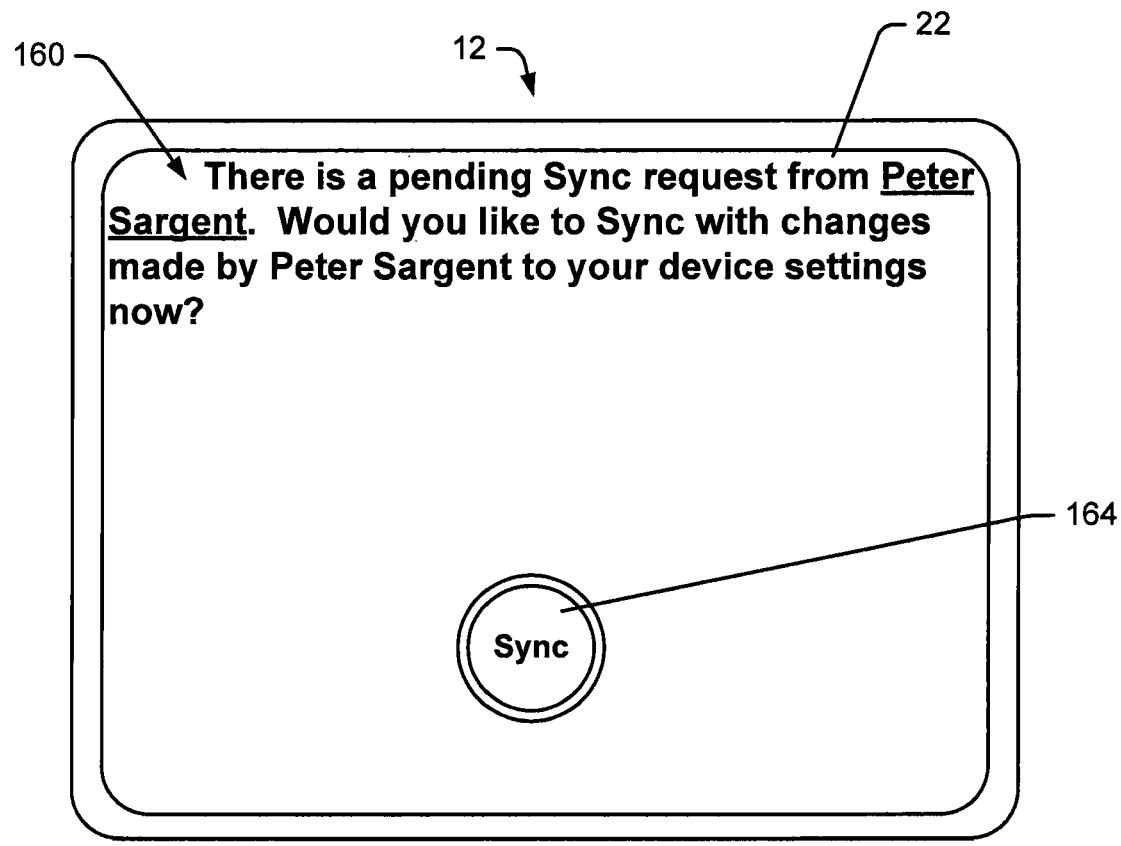
FIG. 9 is schematic illustration a screen shot that may be presented via the assisted user's device display screen shown in FIG. 1.

Consistent with at least some aspects of the present disclosure, one feature that may be implemented via the system shown in FIGS. 1 and 2 is a procedure whereby a proxy using workstation 18 may be able to help an assisted user enter or input contact and other types of information into the assisted user's device 12. To this end, referring also to FIG. 3, a process 60 whereby a proxy helps an assisted user enter contact and other information into the memory of device 12 is shown. The process shown in FIG. 3 includes process steps performed by the computer associated with workstation 18 as well as steps performed by system server 65. Steps performed by the processor in the assisted user's device 12 to update contact and other types of information are shown in FIG. 8. Exemplary screen shots that may be presented via the proxy workstation display 62 (see again FIG. 1) during the contact and other information update process are shown in FIGS. 4-7. An exemplary screen shot used by an assisted user to accept updates made by a proxy to contact and other information on the assisted user's device 12 is shown in FIG. 9.

Figure 3:
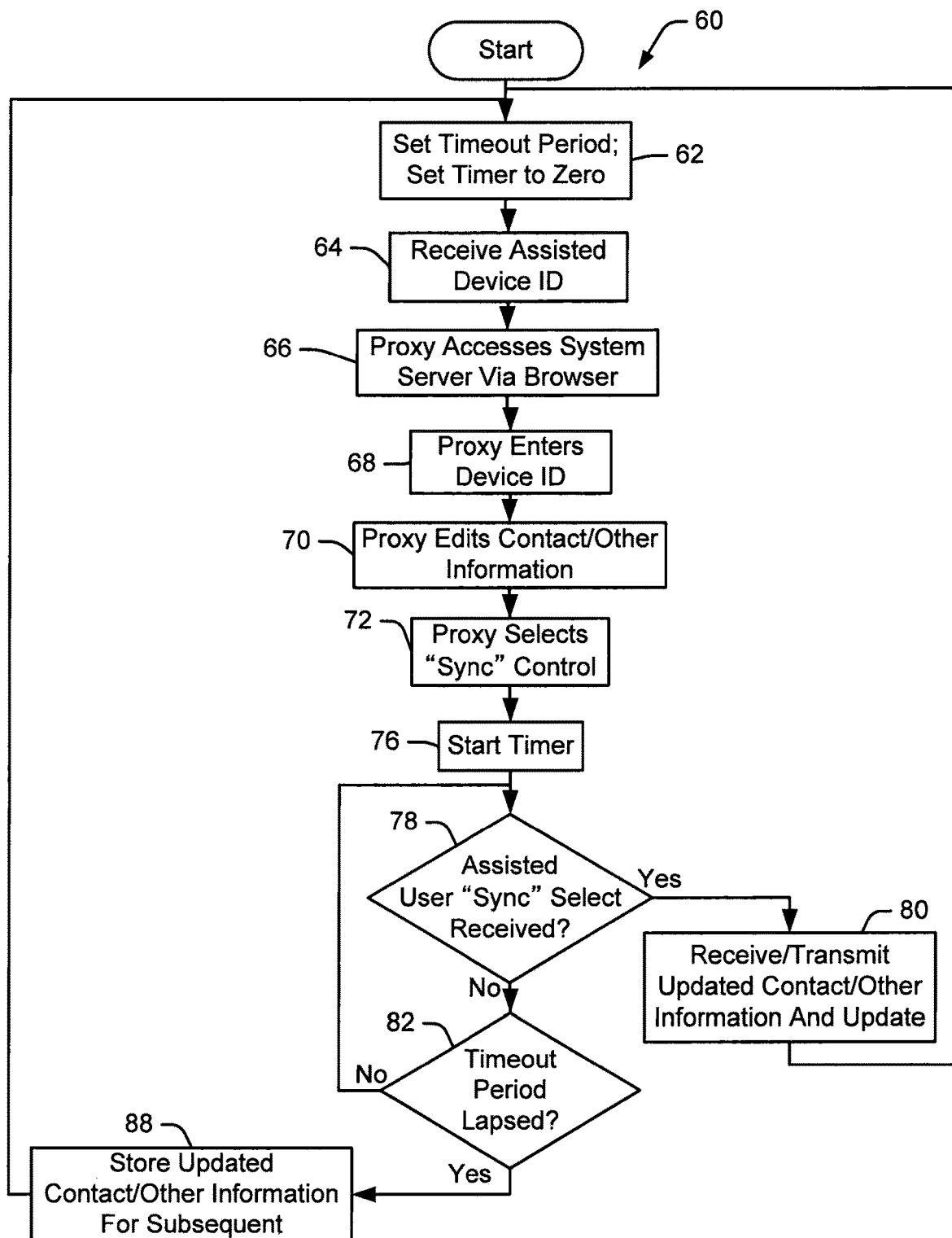
FIG. 3 is a flow chart illustrating a process that may be performed by the proxy workstation and system server shown in FIG. 1 enabling a proxy for an assisted user to enter contact and other types of information to be downloaded to an assisted user's device upon consent.

Referring still to FIGS. 1 and 2 and also to FIG. 3, to begin the contact and other information updating process, at process block 62, a time out period is set. Here, the time out period corresponds to the duration of a period after which a proxy initiates an updating process in which an assisted user has to agree to the updating or synchronizing process in order for the process to be completed. For instance, in at least some embodiments, the time out period may be as short as five or ten minutes. In other embodiments, the time out period may be as long as one or even two hours. In still other embodiments, other time out periods are contemplated. In addition, at process block 62, a timer that is used to time the time out period is set to zero. The idea here is that the timeout period will operate as a type of security measure to ensure that someone does not either inadvertently or nefariously change contact information for or with the help of an assisted user that is confused by a request to sync. By requiring both a proxy and an assisted user to request synchronization substantially simultaneously or within a short time period, a proxy will be encouraged to make changes when the proxy knows that an assisted user is available to confirm a sync process.

Continuing, at block 64, a proxy receives an assisted user's device ID which is required for the proxy to enter any information into the system associated with a specific assisted user. Here, it is contemplated that each assisted user device will be assigned a unique assisted device ID number or character string (hereinafter "a device ID") which can be used by any proxy to enter information for the assisted user. In the present example, it will be assumed that each assisted device ID will include a seven-digit serial number. In the present example, an exemplary seven-digit number for user device 12 shown in FIG. 1 will be "9993364". Other format serial numbers are also contemplated. At block 66, a proxy uses workstation 18 and a browser window opened on screen 62 to access system server 65. When a proxy uses the browser to access the system server website, the server welcomes the proxy onto the site and requests that the proxy enter identifying information for the proxy as well as an assisted user's device ID. To this end, see the exemplary screen shot shown in FIG. 4 where instructions for identifying the proxy and entering the ID are provided at 90 and fields 92 and 94 are provided for the proxy to enter the proxy's name and the assisted user's device ID, respectively. As shown, in the present example, the proxy's name is "Peter Sargent" and the seven-digit device ID is "9993364." In FIG. 3, the proxy enters the device ID at block 68.

Figure 4:
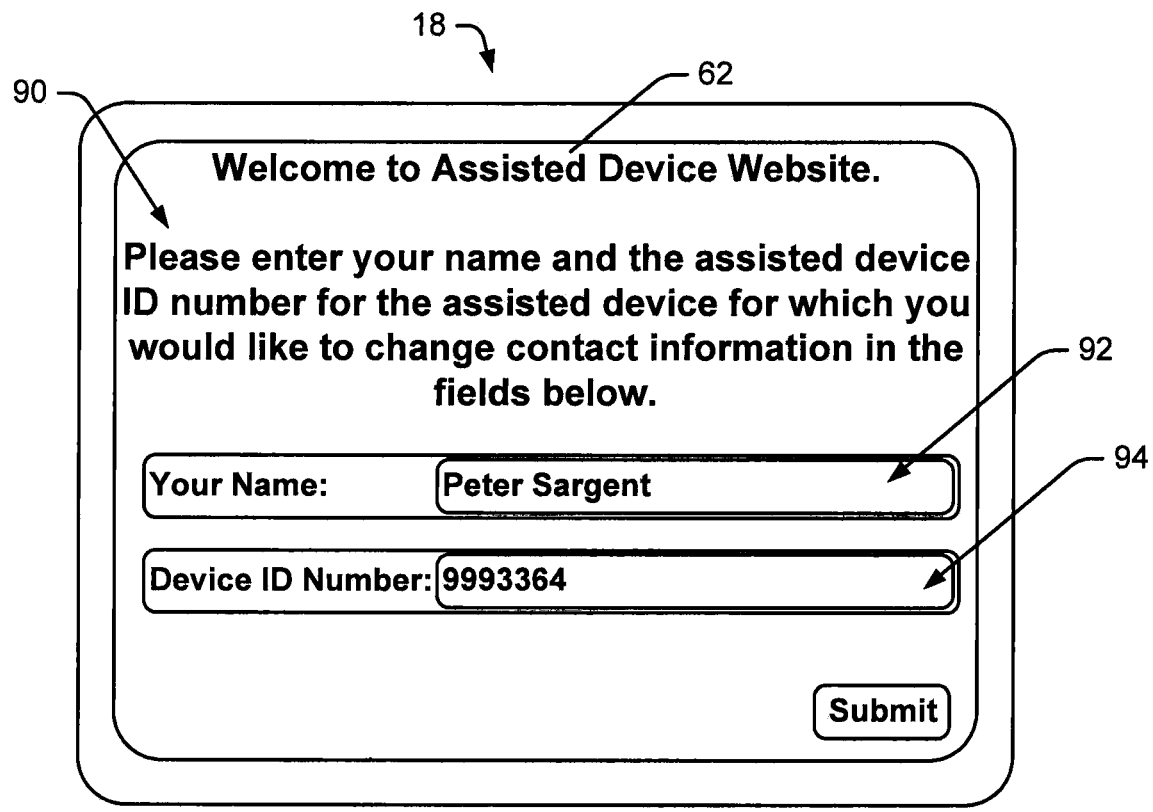
FIG. 4 is a schematic diagram illustrating a screen shot that may be presented via the proxy workstation display screen shown in FIG. 1.
Figure 5:
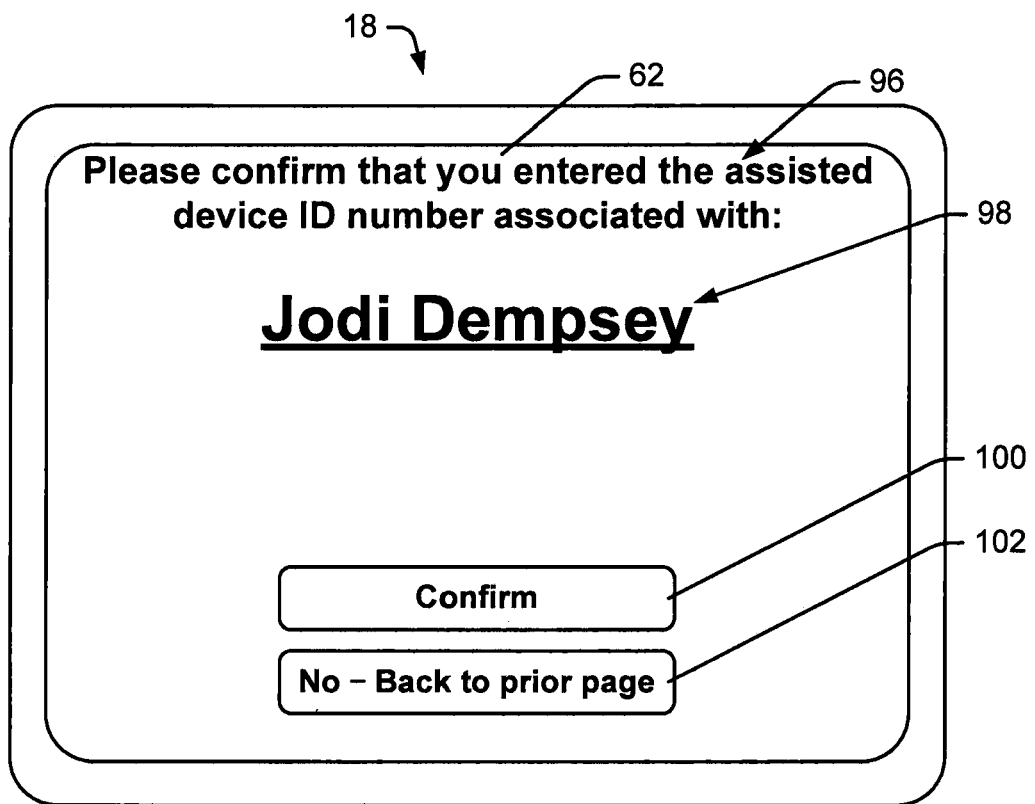
FIG. 5 is similar to FIG. 4, albeit illustrating a different screen shot.

Referring still to FIGS. 1 and 3, and also FIG. 5, after the proxy enters and submits the required information, server 65 attempts to identify the assisted user associated with the device ID. If the device ID was incorrectly entered or there is no device associated with the entered ID, an error is presented to the proxy and a different ID would be requested. Once a device ID that is associated with a particular assisted user's device has been entered, referring to FIG. 5, a confirmation screen shot is provided including instructions 96 requesting that the proxy confirm that the proxy intends to enter information associated with the identified assisted user. In FIG. 5, it can be seen that the assisted user associated with the device ID entered in FIG. 4 is "Jodi Dempsey." In FIG. 5, the assisted user's name 98 is underlined, bolded, highlighted or otherwise visually distinguished so that the proxy can clearly see the name of the assisted user associated with the entered number. The screen shot in FIG. 5 provides both a "Confirm" icon 100 and a "No—back to prior page" icon 102. The proxy can confirm that the user identified at 98 is the correct assisted user by selecting icon 100. To go back and enter a different device ID, the proxy can select icon 102.

Figure 6:
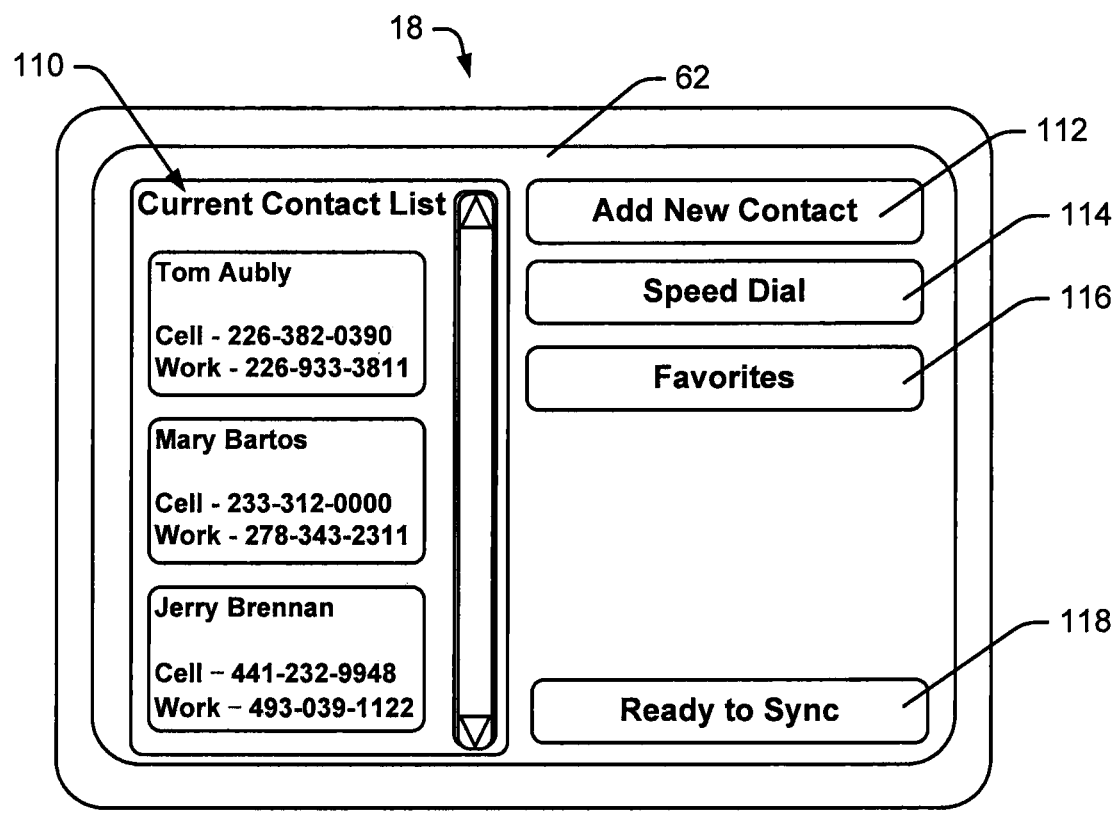
FIG. 6 is similar to FIG. 4, albeit illustrating another screen shot.

Referring still to FIGS. 1 and 3, after the proxy confirms that the user associated with the entered device ID is the correct user, control passes to block 70 where the proxy can edit contact or other information. To this end, see the exemplary screen shot shown at FIG. 6 where current contact information and some control icons are presented. A current contact list is shown at 110 which would include a list of all contacts previously stored in the memory associated with assisted user device 12. Here, while only three contacts are shown in FIG. 6, it is contemplated that thousands of contacts could be stored. In addition, while only name and phone number information is shown in FIG. 6 for each one of the contacts, other information will be stored in at least some embodiments. For example, images of at least some of the contacts may be stored, addresses for the contacts may be stored, e-mails or other contact information for each of the contacts may be stored, notes (e.g., birthdays, wedding dates, job titles, etc.) associated with any one of the contacts may be stored. To modify information associated with a previously stored contact, in some embodiments it is contemplated that the proxy may simply select the contact from the list to open up a menu of tools for adding additional contact information, changing existing contact information, etc.

Referring still to FIG. 6, the exemplary screen shot also includes an "Add New Contact" icon 112, a "Speed Dial" icon 114 and "Favorites" icon 116. Each of icons 112, 114 and 116 may be selected by a proxy to change contact information. For instance, to add a new contact, icon 112 is selected. To add or change speed dial information on device 12, icon 114 is selected. To modify a list of favorites from the contacts in the contact list 110, icon 116 is selected. Other ways for a proxy to modify contact information or, for that matter, to change other types of information associated with the user's device 12 are contemplated and the examples here should not be considered limiting.

Referring yet again to FIG. 6, after a proxy has made changes that the proxy desired to make to the contact information associated with the assisted user, the proxy can select the "Ready to Sync" icon 118 shown at the bottom of the screen shot to start a syncing process.

Figure 7:
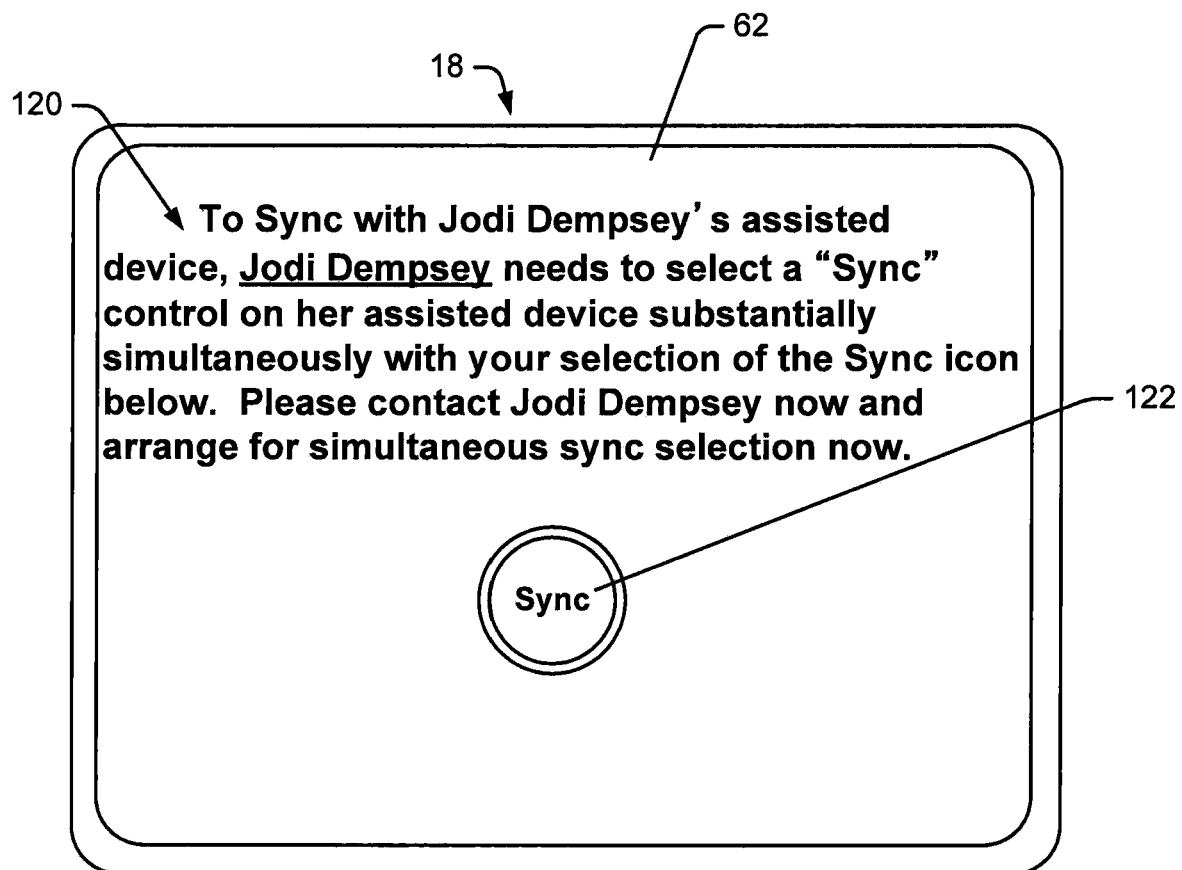
FIG. 7 is similar to FIG. 4, albeit illustrating yet another screen shot.

Referring still to FIGS. 1 and 3, and also to FIG. 7, once the syncing process has been started, in at least some embodiments server 65 may provide instructions 120 via another screen shot to the proxy informing the proxy that for a syncing process to be completed, the assisted user must confirm a desire to sync with the changes to the contact information and other information entered by the proxy within a short time period (i.e., the duration of the time out period set at block 62). The instructions 120 may prompt to the proxy to contact the assisted user (e.g., via e-mail, via the workstation phone 64, etc.) and let the assisted user know that the proxy intends to commence or has commenced a syncing process. At block 72, the proxy selects the sync button 122 shown in FIG. 7. After the sync request has been transmitted, at block 76, server 65 starts the timeout timer, after which control passes down to block 78 and 82, where the server 65 monitors for a "sync" confirmation signal from the assisted user and also monitors for the end of the timeout period.

Referring still to FIGS. 1 through 3 and now also to FIG. 8, the next time the assisted user accesses the assisted user's device, at block 134 device 12 presents a sync selection tool or icon via display 22 at device 12. Referring also to FIG. 9, an exemplary screen shot for presenting icons usable by an assisted user to confirm the desire to sync is shown. The screen shot includes instructions 160 that tell the assisted user how to commence a syncing process. In at least some embodiments the screen shot will also let the assisted user know the identity or name of the proxy that is attempting to edit the contact or other information on the assisted user's device. In FIG. 9, the identity of the proxy is visually distinguished in some fashion such as, for instance, bolding, underlining, highlighting, etc. The screen shot in FIG. 9 also includes the "Sync" icon 164 that can be selected by the assisted user to start a syncing process. In other embodiments a "Sync" icon may always be accessible via the assisted user's device regardless of whether or not a proxy has updated information for a specific user. Here, when the sync icon is selected and there is no updated data, while the assisted user's device may commence the synchronization process, no updating would occur.

Referring again to FIG. 8, after the sync selection screen is presented to the assisted user at block 134, control passes down to block 136 where the assisted user's device processor 20 monitors for a sync selection. If the sync icon is not selected, control continues to loop through blocks 134 and 136. Once the sync icon is selected, control passes down to block 138 where a "sync select" signal is transmitted to server 65. At block 140 a timeout timer is started by assisted user device processor 20 to timeout a synchronization time (e.g., a few seconds, a minute, etc.).

Referring again to FIG. 3, when the server 65 receives the "sync select" signal at block 78, control passes to block 80 where server 65 transmits any updated contact or other information to the assisted user's device 12.

Referring again to FIG. 8, at block 142, when the assisted user's device receives the updated information, the assisted user's device uses that information to update the contact or other information stored in the device memory at block 144. In addition, at blocks 80 and 144, any contact or other information that has been modified by the assisted user via the user's device 12 may be transmitted to server 65 to update that information in the server memory for the assisted user's account. After block 80, control passes back up to block 62 and the process is repeated. In FIG. 8, after block 144, control passes back up to block 134 where monitoring for another sync request occurs.

Referring again to FIG. 8, if no updated information is received after the assisted user selects the sync control, control passes to block 146 where processor 20 determines if the assisted user's device timeout period has lapsed. If the timeout period has not lapsed control passes back up to block 142 where the process described above continues to loop. Once the assisted user's device timeout period lapses, control passes back up to block 134 in FIG. 8.

In FIG. 3, at block 78, if no "sync" signal is received from the assisted user's device control passes to block 82 where the server 65 determines if the timeout period set at block 62 has lapsed. If the timeout period has not lapsed the process continues to loop through blocks 78 and 82. Once the timeout period monitored by the server 65 lapses control passes to block 88 where the updated contact and other information may be stored by server 65 for subsequent use during a subsequent attempt to synchronize with the assisted user's device memory. In other embodiments, block 88 may not be included and the information updated by the proxy may simply be discarded.

Figure 10:
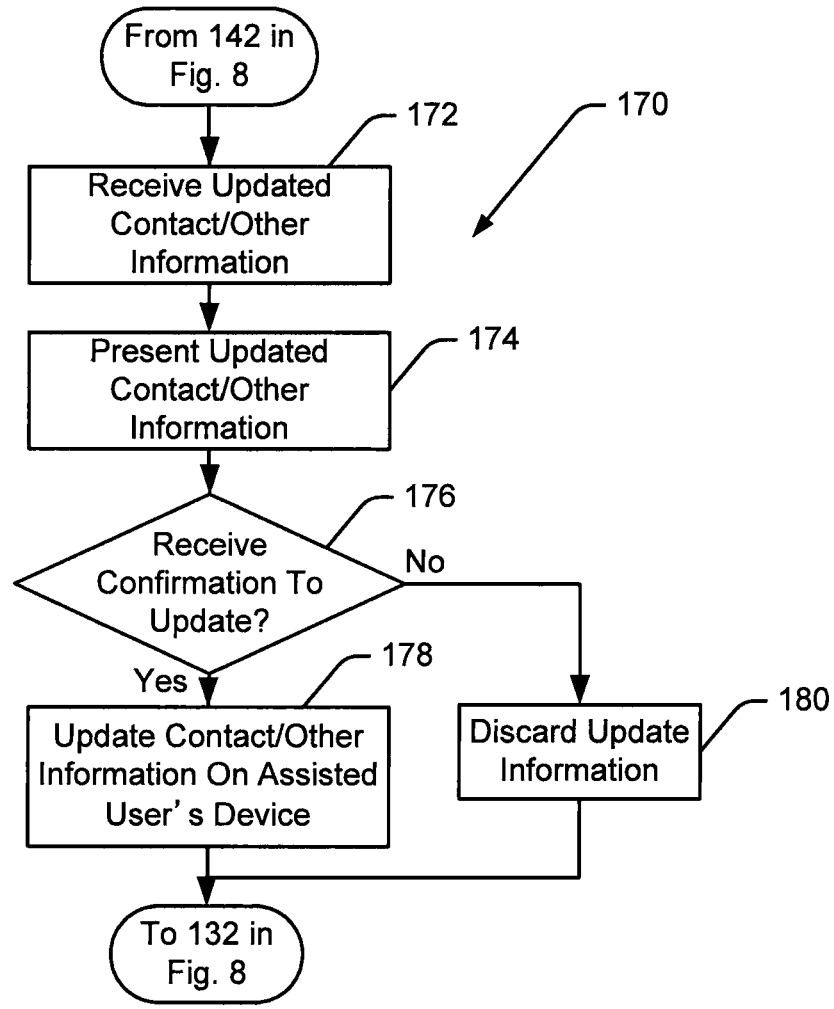
FIG. 10 is a sub process that may be substituted for a portion of the process shown in FIG. 8.

In at least some embodiments it is contemplated that an assisted user may want to view contact and other information updates that a proxy is attempting to make to the assisted user's contact and other information on the assisted user's device prior to authorizing a synchronization. To this end, a sub process 170 that may be substituted for block 144 in FIG. 8 is shown in FIG. 10. Referring also to FIG. 8, after a sync select signal is transmitted to server 65 at block 142, control may pass to block 172 where the assisted user's device 12 (see again FIG. 1) receives the updated contact or other information.

While assisted user confirmation of contact information and other types of device updating is particularly preferred to ensure that only authorized updates are synchronized, in at least some embodiments it is contemplated that one or more "trusted" proxy locations may be designated for each or at least a subset of the assisted users where the trusted proxy can initiate a synchronization update or process without requiring authorization by an assisted user. For instance, in at least some cases a customer service representative for the entity providing the proxy features described above may be a trusted proxy associated with a device (e.g., a computer) that is associated with the provider (e.g., location would be a virtual location associated with a trusted network address, URL, etc., as opposed to a geographic location or may be a geographic location in some cases). This feature would be useful by a customer service representative to assist an assisted user without requiring user confirmation.

In still other embodiments it is contemplated that an assisted user may be able to designate one or more trusted proxies (e.g., a daughter, a social worker, etc.) enabling those proxies to update the assisted user's contact and other information without assisted user authorization. In any of these cases, when an assisted user accesses the user's device, the device may be programmed to automatically link to the system server, check for changes to the contact and other information for the assisted user's device made by a trusted proxy or a proxy at the trusted location and may then update the user's device information if suitable updates are available.

Figure 11:
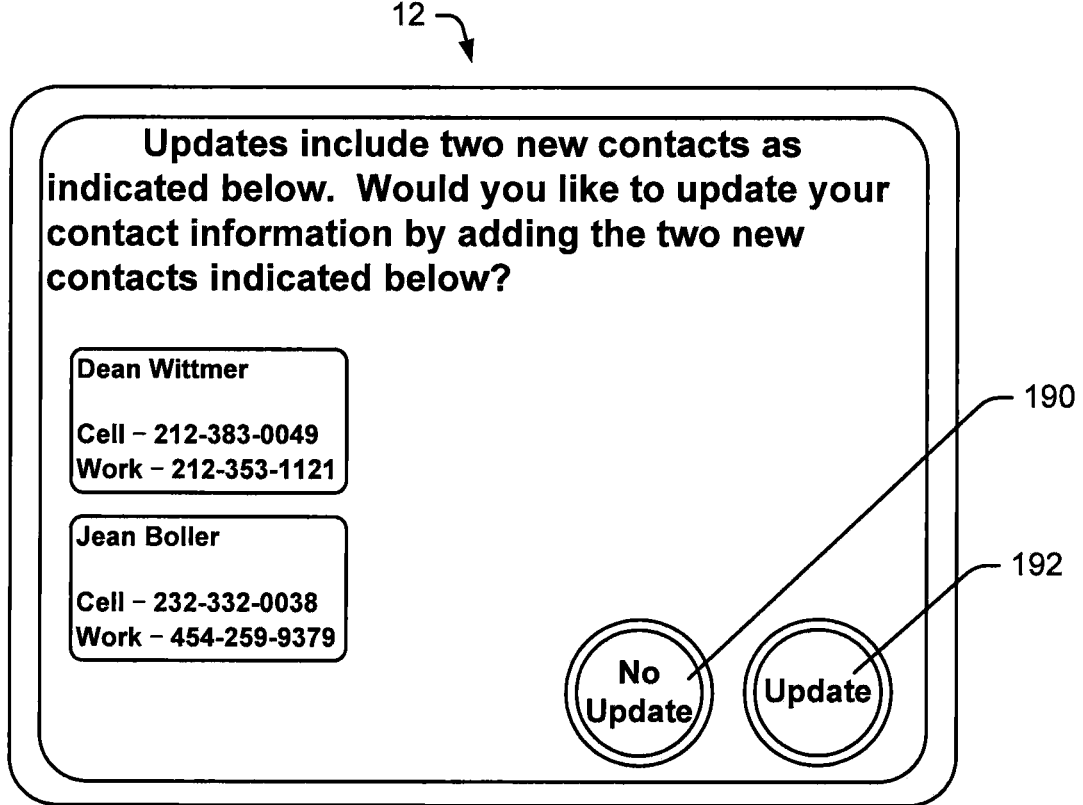
FIG. 11 is yet another screen shot that may be presented via the assisted user's device display screen shown in FIG. 1.

At block 174, the assisted user may be able to access and view the updated contact and other information prior to storing that information on the assisted user's device in a persistent fashion. To this end, see the exemplary screen shot shown in FIG. 11 that provides instructions letting the assisted user know that there is contact information for updating, presenting the contact information to the assisted user and presenting "no update" and "update" icons 190 and 192, respectively, to be selected to either forego the update process or to continue the update process, respectively. At decision block 176, the assisted user's device 12 monitors for a confirmation from the assisted user to update persistently stored contact or other information. If the assisted user opts to forego the update, control passes to block 180 where the updated information is discarded after which control passes back up to block 132 in FIG. 8 as described above. At block 176, if the assisted user confirms that the update process should continue, control passes to block 178 where the contact and other information is used to update the persistently stored information on the assisted user's device 12. After block 178, control passes back up to block 132.

While assisted user confirmation of contact information and other types of device updating is particularly preferred to ensure that only authorized updates are synchronized, in at least some embodiments it is contemplated that one or more "trusted" proxy locations may be designated for each or at least a subset of the assisted users where the trusted proxy can initiate a synchronization update or process without requiring authorization by an assisted user. For instance, in at least some cases a customer service representative for the entity providing the proxy features described above may be a trusted proxy associated with a device (e.g., a computer) that is associated with the provider (e.g., location would be a virtual location associated with a trusted network address, URL, etc., as opposed to a geographic location or may be a geographic location in some cases). This feature would be useful by a customer service representative to assist an assisted user without requiring user confirmation.

In still other embodiments it is contemplated that an assisted user may be able to designate one or more trusted proxies (e.g., a daughter, a social worker, etc.) enabling those proxies to update the assisted user's contact and other information without assisted user authorization. In any of these cases, when an assisted user accesses the user's device, the device may be programmed to automatically link to the system server, check for changes to the contact and other information for the assisted user's device made by a trusted proxy or a proxy at the trusted location and may then update the user's device information if suitable updates are available.

Figure 15:
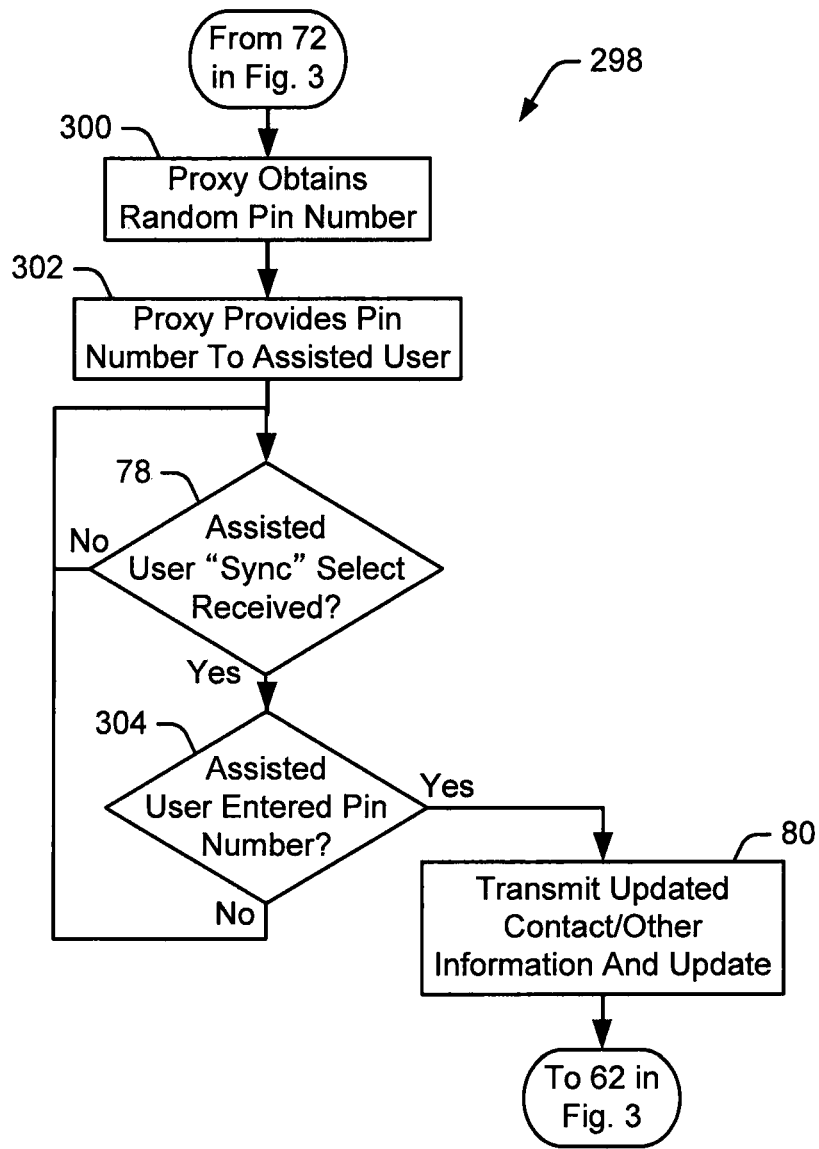
FIG. 15 is a sub-process that may be substituted for a portion of the FIG. 3 process where a pin number is used by a proxy and an assisted user to add an additional level of security to a system.
Figure 16:
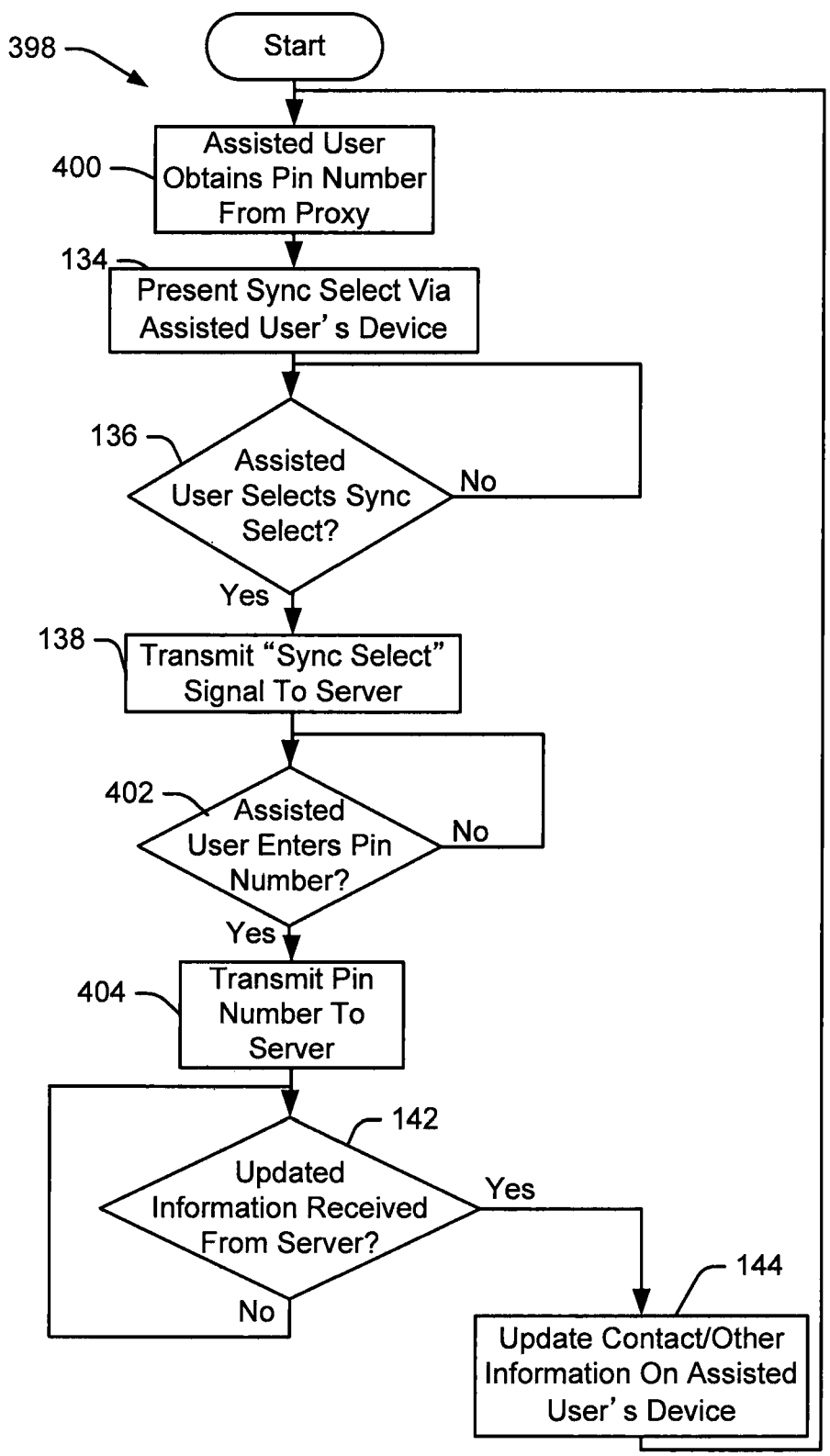
FIG. 16 is a process performed by an assisted user's device as the process associated with FIG. 15 is performed by a system server.

In some embodiments the system processors may be programmed to add another level of security to ensure that only updates from trusted proxies are made to an assisted user's device information. For instance, in at least some embodiments it is contemplated that the system will require both a proxy and an assisted user to enter an identical code or pin number or word in order to initiate data synchronization. To this end see the exemplary sub-process 298 in FIG. 15 that may be substituted for a portion of the FIG. 3 process and the process 398 in FIG. 16 that may be substituted for the process in FIG. 8. In FIGS. 15 and 16 blocks that are labeled with the same numbers as blocks in FIGS. 3 and 8 perform the same steps and therefore are not described again here in detail.

Referring also to FIGS. 1, 2 and 3, after a proxy selects the sync control at block 72, control may pass to block 300 in FIG. 15 where the proxy obtains a random pin number. Here, the step of obtaining a random pin number may include the proxy simply personally selecting a random four digit number. In other cases the step of obtaining a random pin number may include the system server 65 generating a random pin number and providing that number to the proxy. At step 302 the proxy provides the random pin number to an assisted user for which the updates have been entered. Here, the proxy may provide the random pin number in any fashion including, for instance, calling the assisted user via the user's device 12, transmitting an e-mail to the assisted user, etc.

Referring to FIG. 16, at step 400 the assisted user receives the pin number associated with updates made by the proxy from the proxy. At block 134 a sync control is presented to the assisted user via the user's device 12. After the assisted user selects the sync icon at block 136 and the sync select signal is sent to the server 65 at block 138, at block 402 the assisted user's device queries the assisted user for the four digit pin number. Once the pin number is entered at block 402 it is transmitted to server 65 at block 404 after which control passes to block 142 where the assisted user's device waits for updated information from the server 65.

Referring again to FIG. 15, at block 78 server 65 waits for the sync select signal and once it is received the server 65 waits to receive a pin from the assisted user's device. Once the pin is received, control passes to block 80 where the updated information associated with the pin is transmitted to the assisted user's device for updating purposes. After block 80 control passes back up to block 62 in FIG. 3.

In still other embodiments the assisted user may select the random pin number and provide that number to the proxy for entry, the assisted user's device may generate the random number and present it to the assisted user upon selection of a sync control so that the assisted user can provide the pin to the proxy for entry, etc. In yet other embodiments where server 65 generates the random pin, the random pin may be automatically presented to each of the assisted user and the proxy, the proxy via the proxy work station 18 and the assisted user in any fashion including text, e-mail, a voice mail message, etc.

One advantage to requiring entry of identical pin numbers by a proxy and an assisted user is that the timeout timers can be discarded. This is because the pin numbers may provide sufficient security regardless of when an assisted user commences a synchronization process relative to when the proxy updated the user's information. Thus, for instance, a proxy may update an assisted user's content and then send an e-mail to the assisted user indicating that a sync should be performed and including the four digit pin number. Two weeks later the assisted user may want to first synchronize information and may, at that time, enter the pin number to synchronize.

While some embodiments contemplate that a proxy will have to always contact an assisted user to commence a synchronization process, in other embodiments it is contemplated that the server 65 may be programmed to automatically transmit an e-mail, text, voice mail, etc., to an assisted user any time updated information is stored at the server 65. This is particularly useful in cases where a pin number or other code is associated with an update. For instance, an automated e-mail may indicate that synchronization is in order and may provide a pin number to the assisted user irrespective of whether or not the pin was provided to the proxy. In this case the assisted user would simply enter the pin using the user's device 12 to commence synchronization.

Still other embodiments are contemplated that would include both the pin number and timeout timer features for an even higher level of security in some cases.

Figure 12:
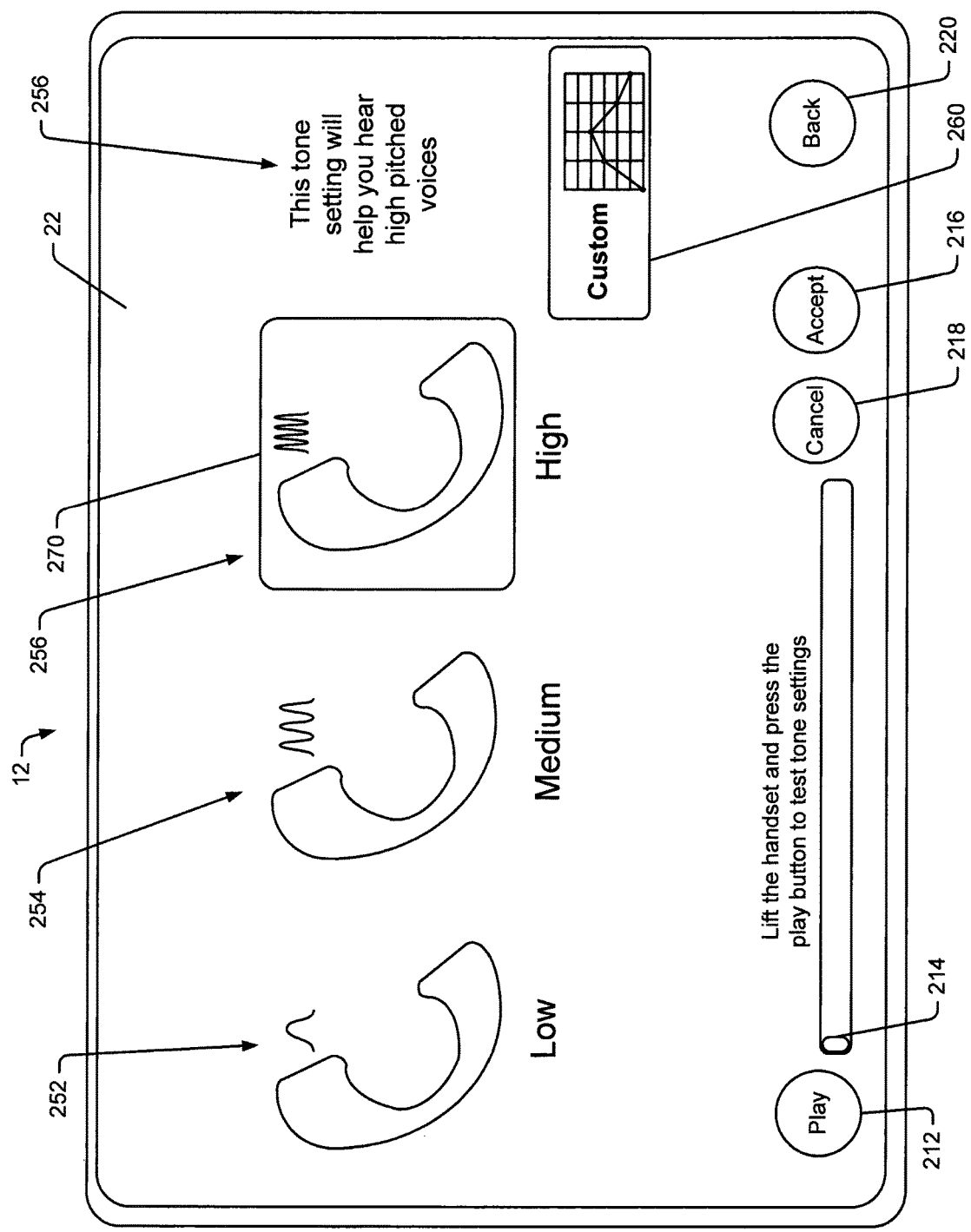
FIG. 12 is a screen shot for setting tones using pre-set high, medium and low tone settings and for listening to sample pre-recorded voice messages to assess which of the three settings is optimal for an assisted user.

Referring now to FIG. 12, an exemplary screen shot that may be presented via an assisted user's device display 22 (see again FIG. 1) for adjusting the tone of voice messages broadcast by the assisted user's device speaker 24 (see again FIG. 2) is shown. As illustrated, the screen shot includes three pre-set tone frequency settings that have been optimized for hearing low, medium and high pitch voices that can be selected by an assisted user. To this end see touch selectable icons 252, 254 and 256, respectively, that correspond to low, medium and high pitch voices. Text is also presented at 258 to indicate textually to a user which pitch each setting is optimized for. For instance, in FIG. 12, a selection box 270 surrounds icon 256 indicating that the high pitch icon has been selected and the text 258 indicates that the settings are optimized for high pitch voices.

Once broadcast tone has been selected by an assisted user, in at least some embodiments, the assisted user may choose to listen to a pre-recorded sample voice recording broadcast by the device speaker 24 so that the assisted user can determine whether or not the tone settings are optimized for the particular user. To this end, the screen shot in FIG. 12 also includes a play icon 212 that can be selected to play the sample recording. In at least some embodiments, the sample recording may include a female voice followed by a male voice to generate both female and male voice messages for the assisted user to listen to while assessing whether or not the tone is optimized for the particular user. The recording is played at the current volume setting on the phone.

As a sample recording is played, a bar 214 moves along an elongated recording field to indicate where along the duration of the sample recording the broadcast is at any given time. Here, if desired, the assisted user may move bar 214 to any location along the recording field and again select the play icon 212 to listen to a portion of the recording. For example, if an assisted user can easily hear a female voice that is first broadcast as part of the recording, but is having difficulty hearing a male voice presented during the second half of the recording, the assisted user may move bar 214 to approximately the midway point along the recording field and then select the play icon 212 to play only the male portion of the sample recording.

The FIG. 12 screen shot also includes a "Custom" icon 260 that can be selected to further customize broadcast tone if an assisted user perceives that none of the low, medium or high tone settings is acceptable or optimized. When icon 260 is selected, the assisted user's device 12 may present the exemplary screen shot shown in FIG. 13 which is described in more detail below.

If an assisted user perceives that the tone is optimized after one or more broadcasts of the recorded voices, the assisted user can select an accept icon 216 to store the frequency setting within a device memory (see again FIG. 2) for subsequent use. If an assisted user perceives that an original or initial tone setting was best for that particular user, the assisted user can simply select a "cancel" icon 218 to go back to the initial or original tone setting. An assisted user can exit the tone setting tools by selecting "Back" icon 220 to access other device screens for initiating a communication or to facilitate other device functionality.

Figure 13:
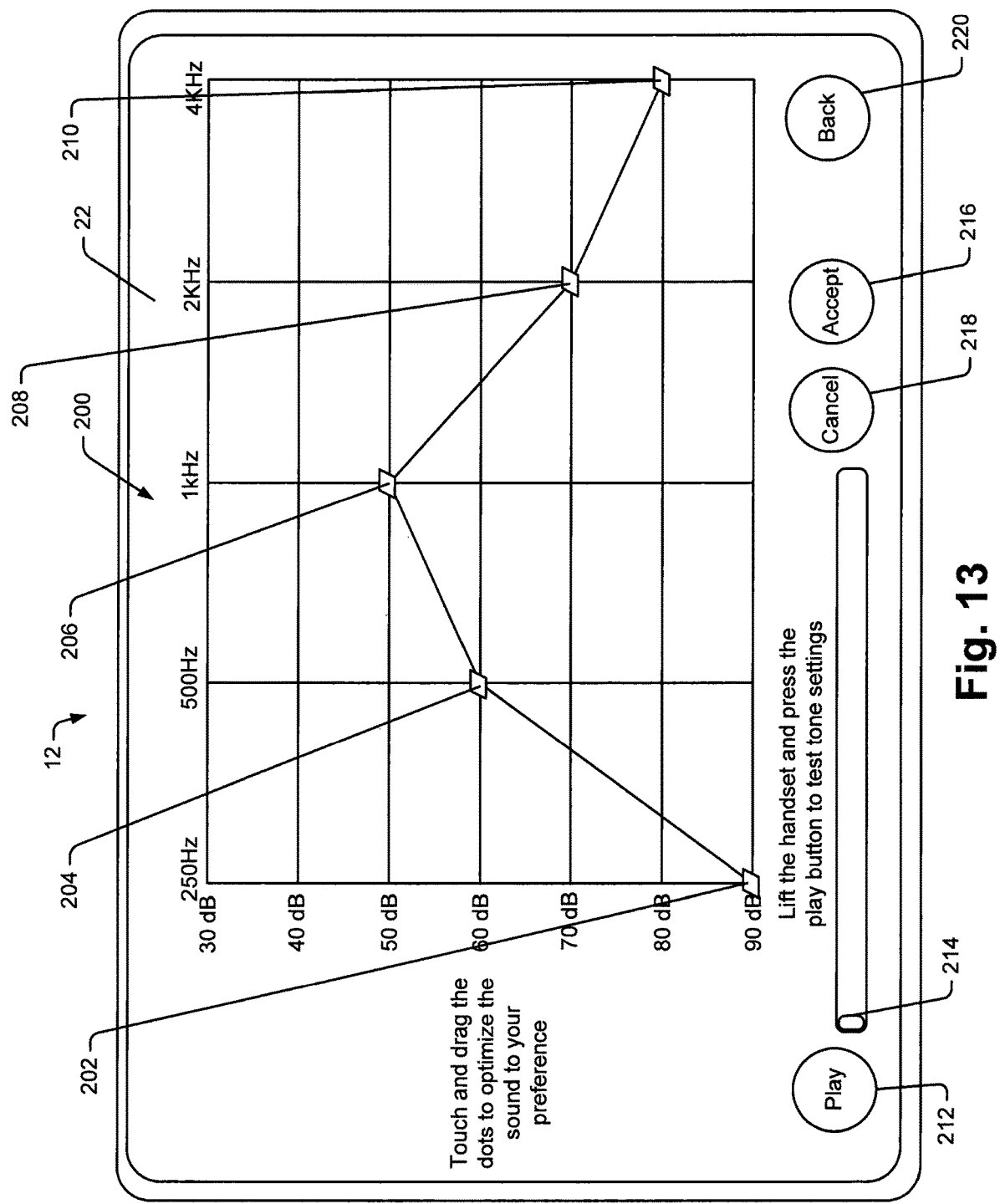
FIG. 13 is similar to FIG. 12, albeit providing a customizing equalizer tool for personal customization of an audiogram.

Referring to FIG. 13, the exemplary customizing screen shot includes an equalizer graph depiction 200 including a range of frequencies along an upper horizontal X axis and a range of decibels along a left vertical Y axis. The exemplary illustrated frequencies include 250 Hz, 500 Hz, 1 kHz, 2 kHz, and 4 kHz. A separate slide column is associated with each one of the frequencies on the representation 200 and a separate slider control is associated with each one of the slide columns. For example, a slider control 202 is associated with the 250 Hz column. Other sliders 204, 206, 208 and 210 are associated with the 500 Hz, 1 kHz, 2 kHz and 4 kHz columns, respectively.

Each one of the slider controls can be moved up or down within the decibel range illustrated to adjust the relative effect of the associated frequency on the overall tone of the broadcasted voice messages. To this end, in at least some embodiments, the display 22 may be a touch sensitive display so that an assisted user can simply touch one of the slider controls and move the slider control up and down the associated slide column. Once the slider controls are set as desired by an assisted user, in at least some embodiments, the assisted user may choose to listen to an optimal sample voice recording broadcast by the device speaker 24 in the fashion described above with respect to FIG. 12. To this end, the FIG. 13 screen shot includes similar control icons and tools 212, 214, 216, 218 and 220 that operate as indicated above. Here, the "Back" control causes device 12 to simply replace the FIG. 13 screen shot with the FIG. 12 screen shot.

If the assisted user listens to a recording and does not believe that the tone has been optimally set for the user, the assisted user can simply reposition the slider controls 202, 204, 206, 208 and 210 along the slide columns to modify the output tone and select the play icon 212 again to rehear the sample recording and personally assess whether or not the tone is optimized.

Figure 14:
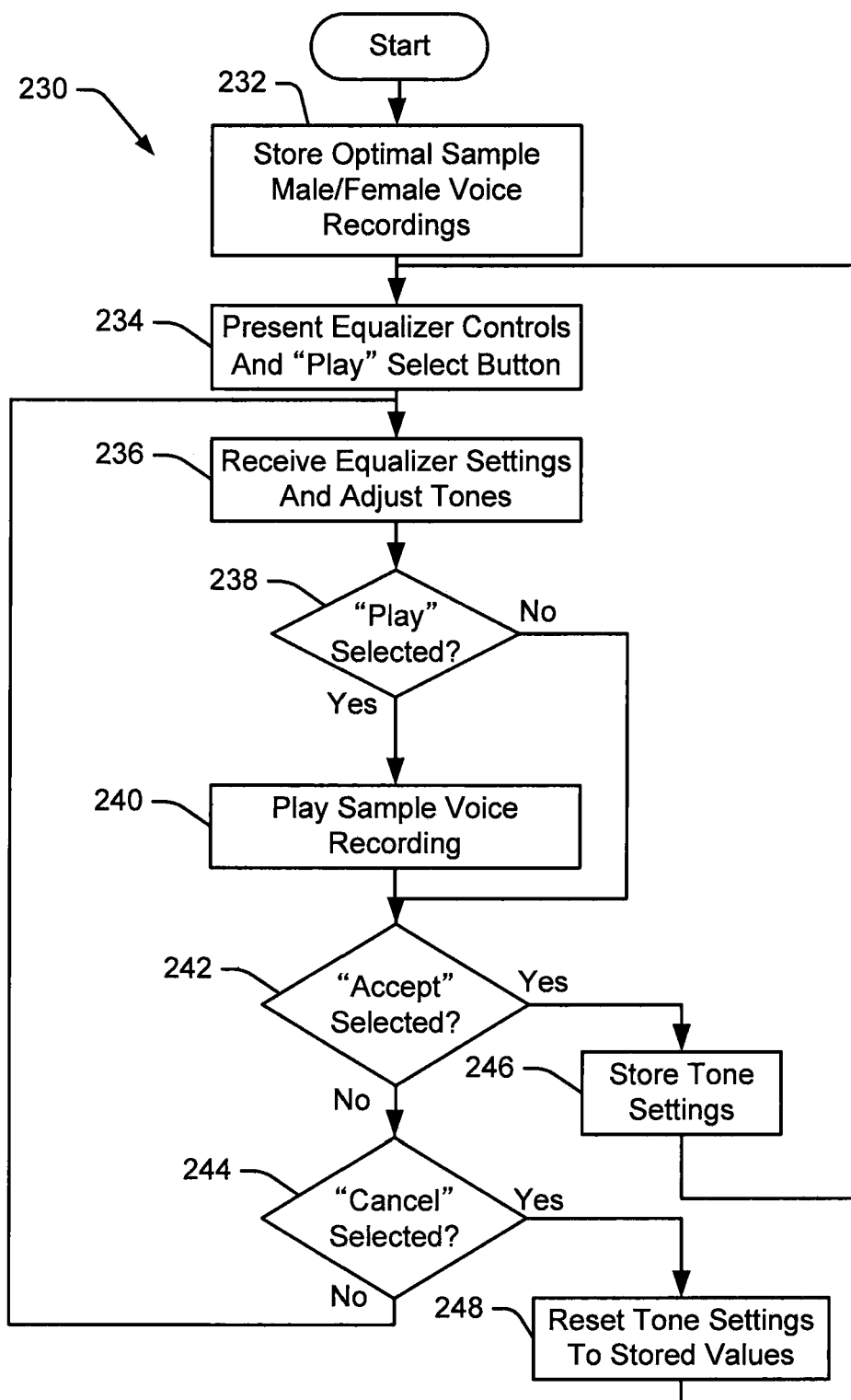
FIG. 14 is a flow chart illustrating a process that may be performed by the processor shown in FIG. 2 for setting tone on an assisted user's device.

Referring now to FIG. 14, an exemplary process 230 that may be performed by the assisted user using an assisted user's device 12 and the exemplary tools shown in FIGS. 12 and 13 is shown at 230. Referring also to FIGS. 1 and 2, at block 232, the user's device 12 stores an optimal sample male/female voice recording in the device memory. At block 234, a device user causes the device 12 to access tone setting software (e.g., via selection of a "settings" or "preferences" icon on display 22). At block 234, once the tone setting tool is accessed, device 12 presents the screen shot shown at FIG. 12 (or in FIG. 13). At block 236, an assisted user uses the tone setting controls to adjust tone. At block 238, the assisted user's device processor 12 (see again FIG. 2) monitors for selection of the play icon 212. If play icon is not selected at block 238, control passes to block 242 and on to block 244 where the processor 20 monitors for selection of either the accept icon 216 or the cancel icon 218, respectively. If the play icon is selected at decision block 238, control passes to block 240, where processor 20 plays the sample voice recording for the assisted user. After block 240, control passes down to blocks 242 and 244. At block 242, if the accept icon 216 is not selected, control passes to block 244. At block 244, if the cancel icon 218 is not selected, control passes back up to block 236 where the assisted user can continually adjust the slider controls and play the sample recording until the tone is optimized.

Referring still to FIGS. 1, 2 and 12 through 14, at block 242, if the accept icon 216 is selected, control passes to block 246 where the tone settings are stored by processor 12 after which control passes back up to block 234. At block 244, if a cancel icon is selected control passes to block 248 where the tone settings for the device 12 are reset to the stored initial values and control passes back up to block 234 where the process continues.

In at least some embodiments it is contemplated that an assisted user may have different tone preferences for different types of voices. For instance, an assisted user may prefer one tone setting for a male voice and another tone setting for a female voice. In some embodiments an assisted user may be able to use the tone setting tools in FIGS. 12 and 13 or similar tools to set separate make and female audiograms (e.g., customized equalizer settings as shown in FIG. 13). The assisted user's device processor 20 may be programmed to categorize any incoming voice message as either typically male or typically female based on tones in the voice and to then use one of the two associated male and female audiograms to tune the message for broadcasting to the assisted user. More than two different customized audiograms are contemplated where the processor 20 may be programmed to distinguish between multiple voice types (e.g., 4) and to use different audiograms for different voice types.

In at least some embodiments it is contemplated that an assisted user may be able to customize an audiogram for one or more specific hearing users. For instance, where an assisted user routinely converses with five hearing users, in at least some embodiments the assisted user may identify a separate audiogram for each of the five hearing users which can be stored in a database with one or more phone numbers associated with the specific hearing user. For instance, while an assisted user is conversing with the assisted user's daughter, the assisted user may access the equalizer tool in FIG. 13 and play with the tone settings until the user can optimally hear the daughter's voice messages being broadcast. Once the tone is optimized, the user may store the tone to be subsequently used whenever the assisted user device is linked to the daughter's telephone (e.g., stored with the phone number associated with the daughter's phone). Thereafter, when the daughter's phone is linked to the assisted user's device 12, processor 20 may automatically use the audiogram associated with the daughter's phone number to optimize the tone. Other optimized audiograms for other phone numbers may be stored and automatically used subsequently.

In some embodiments processor 20 may be programmed to recognize specific hearing person's voices and to select previously stored audiograms for specific hearing user's that call an assisted user. Here, voice unique audiograms may be specified and stored by an assisted user for subsequent use. This feature would enable caller specific audiograms for at least a subset of frequent callers irrespective of the phone numbers used by the callers. This feature would also enable tone preferences for multiple callers that use the same phone to call an assisted user's device. For instance, where an assisted user's daughter is married and has four kids so that six people may call the assisted user routinely using the daughter's phone, different audiograms may be stored for each of the six possible callers or for the two most frequent callers (e.g., the daughter and a grandson) with a generic audiogram used when any of the other four callers call.

While the system is described above as one where an assisted user's contact and other information is stored in a memory maintained on an assisted user's device, in other embodiments it is contemplated that an assisted user's contact and other information may be stored somewhere else such as, for instance, in a database associated with the system server or some other remote server. In this case, if a proxy attempts to update or change contact information a process similar to the process described above would be performed to seek and obtain confirmation to update from an assisted user and then the data in the server would be updated accordingly.

The particular embodiments disclosed above are illustrative only, as the invention may be modified and practiced in different but equivalent manners apparent to those skilled in the art having the benefit of the teachings herein. For example, while the system described above does not allow a proxy to indicate to an assisted user's device when information is available for updating the user's device information, in other embodiments once a proxy has indicated that update data is ready to be synchronized with an assisted user's device, the proxy may transmit a sync request to an assisted user's device. In this case the sync control option may only be provided on the assisted user's device within a time out period after a proxy has requested synchronization. In this case the assisted user may select the sync control icon to commence synchronization as described above. Where the sync control is not selected within the time out period, the sync control may be removed from the assisted user's device.

In at least some cases it is contemplated that a "No sync" control may also be presented to an assisted user via a virtual control icon suitably labelled. In these cases, if the no sync icon is selected, a no sync signal may be sent to the server causing the server to forego the synchronization process.

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for setting preferred frequency volumes for use with a communication device that includes an audio output device and a display screen, the method for adjusting the sound of voice signals received from a remote communication device prior to broadcasting those signals audibly via the audio output device, the method comprising the steps of:
presenting a preset frequency setting interface on a display screen including a plurality of different frequency volume setting options including at least a first selectable option where a volume of low frequencies is higher than volumes of middle and high frequencies, a second selectable option where the volume of middle frequencies is higher than the volumes of low and high frequencies, and a third selectable option where the volume of high frequencies is higher than the volumes of middle and low frequencies, and wherein the preset frequency setting interface also includes a selectable custom option;
upon selection of one of the first, second or third options, setting the frequency volume settings to the settings associated with the selected option;
upon selection of the custom option, presenting a customizing audio adjustment interface via the display screen, the audio adjustment interface including visual depiction of a plurality of volume settings that each correspond to a different one of a plurality of frequencies, the plurality of volume settings indicating amplifications applied to the plurality of frequencies prior to broadcasting a voice signal via the audio output device; and
upon selection of volume settings via the customizing audio adjustment interface, setting the frequency volume settings to the settings associated with the selected settings.

2. The method of claim 1 further including, subsequent to selecting frequency volume settings, upon receiving a voice signal from a remote communication device during a communication session, applying the set frequency volume settings to the voice signal and broadcasting an adjusted voice signal via the audio output device.

3. The method of claim 1 wherein the preset frequency setting interface further includes a text representation of each of the first, second and third selectable options indicating high volume frequencies associated with each of the options.

4. The method of claim 3 wherein the text representations include low, medium and high, respectively.

5. The method of claim 1 wherein the interface further includes a play option that can be selected to hear a pre-recorded voice signal with current frequency settings broadcast via the audio output device.

6. The method of claim 1 wherein the method is repeated for different types of voice signals.

7. The method of claim 6 wherein the different types of voice signals include first and second different types of voice signals, and wherein preferred first and second different frequency settings are stored for the first and second different types of voice signals, respectively.

8. The method of claim 7 further including, upon receiving a voice signal from a remote communication device during a communication session, characterizing the voice signal as one of the first and second different types of voice signals and then applying the set frequency volume settings associated with the one of the types to the voice signal and broadcasting an adjusted voice signal via the audio output device.

9. The method of claim 8 wherein the first and second different types of voice signals include a low pitched signal type and a high pitched signal type.

10. A method for setting preferred frequency volumes for use with a communication device that includes an audio output device and a display screen, the method for adjusting the sound of voice signals received from a remote communication device prior to broadcasting those signals audibly via the audio output device, the method comprising the steps of:
receiving and storing user inputs selecting preferred voice signal frequency volume adjustments for a first voice signal of a first voice type where the first voice type has first voice signal characteristics;
receiving and storing user inputs selecting preferred voice signal frequency volume adjustments for at least a second voice signal of a second voice type where the second voice type has second voice signal characteristics that are different than the first voice signal characteristics;
during a communication session while a voice signal is received from a remote communication device at the communication device:
(i) identifying characteristics of the received voice signal;
(ii) based on the identified characteristics, associating the received voice signal with a voice of one of the first and second voice types;

(iii) when the received voice signal is associated with the first voice type, applying the preferred voice signal frequency volume adjustments associated with the first voice type to the received voice signal;

(iv) when the received voice signal is associated with the second voice type, applying the preferred voice signal frequency volume adjustments associated with the second voice type to the received voice signal; and (v) broadcasting an adjusted voice signal via the audio output device.

11. The method of claim 10 wherein the step of receiving user inputs associated with a first voice type includes presenting an audio adjustment user interface on the display screen useable to adjust volumes of a plurality of different frequencies of a voice signal and, while broadcasting a pre-recorded voice signal of the first voice type, receiving frequency volume adjustments and applying those adjustments to the broadcast voice signal until user preferences are met and storing those frequency volume adjustments, the step of receiving user inputs associated with a second voice type includes presenting an audio adjustment user interface on the display screen useable to adjust volumes of a plurality of different frequencies of a voice signal and, while broadcasting a pre-recorded voice signal of the second voice type, receiving frequency volume adjustments and applying those adjustments to the broadcast voice signal until user preferences are met and storing those frequency volume adjustments.

12. The method of claim 11 wherein the steps of presenting an audio adjustment user interface include presenting an audio adjustment user interface on the display screen that includes a visual depiction of a plurality of volume settings that each correspond to a different one of a plurality of frequencies, the plurality of volume settings indicating amplifications applied to the plurality of frequencies of the audio output by the communication device.

13. The method of claim 12 wherein the display screen is a touch sensitive display screen where user inputs are received via touch action on the display screen.

14. The method of claim 10 wherein the step of receiving user inputs associated with a first voice type includes presenting an audio adjustment user interface on the display screen useable to adjust volumes of a plurality of different frequencies of a voice signal and, while broadcasting a voice signal from a remote speaking person during a communication session where the remote speaking person's voice signal is of the first voice type, receiving frequency volume adjustments and applying those adjustments to the broadcast voice signal until user preferences are met and storing those frequency volume adjustments in association with the first voice type, the step of receiving user inputs associated with a second voice type includes presenting an audio adjustment user interface on the display screen useable to adjust volumes of a plurality of different frequencies of a voice signal and, while broadcasting a voice signal from a remote speaking person during a communication session where the remote speaking person's voice signal is of the second voice type, receiving frequency volume adjustments and applying those adjustments to the broadcast voice signal until user preferences are met and storing those frequency volume adjustments.

15. The method of claim 10 further including the step of receiving and storing user inputs selecting preferred voice signal frequency volume adjustments for a third voice signal of a third voice type where the third voice type has third voice signal characteristics, the step of associating the received voice signal including associating the received voice signal with one of the first, second or third voice types and, when the received voice signal is associated with the third voice type, applying the preferred voice signal frequency volume adjustments associated with the third voice type to the received voice signal.

16. A method for setting preferred frequency volumes for use with a communication device that includes an audio output device and a display screen, the method for adjusting the sound of voice signals received from a remote communication device prior to broadcasting those signals audibly via the audio output device, the method comprising the steps of:

storing a plurality of audiograms in a database wherein each audiogram is associated with a different one of a plurality of voice types, wherein each audiogram includes volume settings for a plurality of frequencies within a voice signal;

during a communication session while a voice signal is received from a remote communication device at the communication device:

(i) identifying characteristics of the received voice signal;

(ii) based on the identified characteristics, identifying the received voice signal as being of a specific one of the plurality of voice types;

(iii) applying the audiogram associated with the specific one of the plurality of types to the received voice signal to generate an adjusted voice signal; and (iv) broadcasting the adjusted voice signal via the audio output device.

17. The method of claim 16 wherein the plurality of audiograms includes at least first and second audiograms that are associated with first and second voice types, respectively.

18. The method of claim 16 wherein the plurality of audiograms includes at least first, second, third and fourth audiograms that are associated with first, second, third and fourth voice types, respectively.

19. The method of claim 16 further including receiving user inputs to select preferences for frequency volumes for each of the plurality of voice types.

20. The method of claim 19 wherein the step of receiving user inputs includes receiving the inputs during an ongoing voice communication to adjust the frequency volumes to meet user preferences for a voice signal received from a remote communication device.

* * * * *